United States Patent
Ellis, Jr. et al.

(10) Patent No.: US 12,210,610 B2
(45) Date of Patent: *Jan. 28, 2025

(54) AUTHENTICATION USING MAGNETIC FIELD BASED ON CURRENT DRAWN BY SECURITY DEVICE

(71) Applicant: LEXMARK INTERNATIONAL, INC., Lexington, KY (US)

(72) Inventors: James Howard Ellis, Jr., Lexington, KY (US); Timothy John Rademacher, Richmond, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 142 days.

This patent is subject to a terminal disclaimer.

(21) Appl. No.: 17/846,281

(22) Filed: Jun. 22, 2022

(65) Prior Publication Data
US 2023/0409690 A1  Dec. 21, 2023

Related U.S. Application Data

(63) Continuation of application No. 17/840,979, filed on Jun. 15, 2022.

(51) Int. Cl.
| | |
|---|---|
| *G06F 21/44* | (2013.01) |
| *G01R 33/02* | (2006.01) |
| *G01R 33/07* | (2006.01) |
| *G01R 33/09* | (2006.01) |
| *G06F 21/34* | (2013.01) |

(52) U.S. Cl.
CPC ............ *G06F 21/44* (2013.01); *G01R 33/02* (2013.01); *G01R 33/07* (2013.01); *G01R 33/09* (2013.01); *G06F 21/34* (2013.01)

(58) Field of Classification Search
CPC ......... G06F 21/44; G06F 21/34; G01R 33/02; G01R 33/07; G01R 33/09
See application file for complete search history.

(56) References Cited

U.S. PATENT DOCUMENTS

| | | | |
|---|---|---|---|
| 9,542,576 B1* | 1/2017 | Ahne | G03G 21/1892 |
| 9,665,748 B1* | 5/2017 | Ahne | G03G 15/0865 |
| 2003/0085277 A1* | 5/2003 | DeLand, Jr. | G06K 7/087 |
| | | | 235/449 |
| 2004/0167860 A1* | 8/2004 | Baxter | G06Q 20/3674 |
| | | | 705/64 |

* cited by examiner

*Primary Examiner* — Beemnet W Dada

(57) ABSTRACT

A method for determining authenticity of a security device of a component in an imaging device includes receiving, by the security device, an authentication challenge including one or more commands and executing, by the security device, the one or more commands in response to receiving the authentication challenge. A magnetic field profile is generated based on current drawn by the security device from a power source while the security device is executing the one or more commands, the generated magnetic field profile indicating an authentication response of the security device to the authentication challenge for use in determining authenticity of the security device.

20 Claims, 14 Drawing Sheets

AUTHENTICATION USING MAGNETIC FIELD BASED ON CURRENT DRAWN BY SECURITY DEVICE

CROSS REFERENCES TO RELATED APPLICATIONS

This application claims priority as a continuation application of U.S. patent application Ser. No. 17/840,979, filed Jun. 15, 2022, having the same title.

FIELD OF THE INVENTION

The present disclosure relates generally to authentication schemes, and more particularly to authentication of security devices using magnetic field based authentication. Particular embodiments include methods of generating a magnetic field profile when a security device draws current while executing commands in response to an authentication challenge and using the magnetic field profile as a response to the authentication challenge.

BACKGROUND

In some imaging devices, supply items such as ink and toner cartridges are replaceable due to depletion of the consumable therein. In other supply items, such as imaging units and fusers, they are replaceable due to wear of physical mechanisms. It is common to place security devices or integrated circuits with encryption and authentication circuits, based on digital technology, on supply items and connect these security devices with a controller in the printer. The controller usually contains a system-on-chip (SoC) and non-volatile memory (NVM) from which it executes firmware to direct the authentication of security devices on supply items to verify whether the supply items are genuine and authentic.

In some cases, the same security device (which may be referred to as a system security device) is also placed on the controller to reduce the likelihood of tampering during the authentication of security devices on supply items. In such an arrangement, the controller may verify the authenticity of the supply item by generating and sending a cryptographic challenge, either directly from the SoC or through the system security device, to the security device on the supply item which generates a response and returns it to the controller. For example, in a typical cryptographic based authentication, authentication begins with the SoC instructing the system security device to generate an authentication challenge that is sent it to a supply item security device. The supply item security device next generates a response to the challenge and returns the response to the system security device. In turn, the system security device verifies the response to determine the authenticity of the security device on the supply item. Since the challenge and response are both generated and communicated digitally over a serial interface, the authentication produces a deterministic result in which execution produces the same result under the same circumstances and/or inputs. If the SoC verifies that the security device on the supply item responds correctly to the challenge, the supply item is determined to be authentic. Otherwise, if the security device on the supply item responds incorrectly, the supply item is determined to be non-authentic and an enforcement action may be initiated. The enforcement action may consist of no notification to the user, notification to the user that a non-authentic supply item is installed, or notification to the user that an unsupported supply item is installed. In some cases, if a security device is copied, it may produce the same digital response as an authentic device making it difficult to distinguish a non-authentic device from an authentic device, so a new method of authentication is desired.

One of the difficulties, however, in developing security devices based on integrated circuit technology (security chips) is that they are susceptible to being reverse engineered by an attacker either decrypting data communicated over a digital interface or copying the security device using chip delayering, imaging, netlist extraction, memory extraction techniques, and the like. If a security device is reverse engineered and copied, it may produce the same digital behavior as the authentic device making it challenging to distinguish a non-authentic device from an authentic device. As a result, the inventors recognize desirability to develop new methods of authenticating security devices on supply items beyond those digital methods known in the art.

The authentication system disclosed in U.S. patent application Ser. No. 17/469,601 entitled "Authentication Using Current Drawn by Security Device" introduced the use of current drawn by a security device in response to an execution of a command or a series of commands as an authentication parameter. Because the current drawn by the security device is expected to be a unique physical attribute of the security device, the inventors have discovered that the current drawn may be used in whole or in part to determine authenticity of the security device. Specifically, a current monitor circuit can be used to convert the current drawn by the security device into an analog voltage when a trigger condition is detected. The analog voltage is then converted into a digital value by an analog-to-digital converter (ADC) and the digital value is captured and stored in memory as a captured current profile. The captured current profile is then compared with the expected current profile (which is predetermined and stored in memory or dynamically generated) and a determination is made of the authenticity of the security device on the supply item. The inventors further recognize a need to provide additional methods for authentication of security devices on supply items.

SUMMARY

The foregoing and other are solved by using magnetic field-based authentication where magnetic field profiles, generated based on current drawn by security devices when the security devices respond to authentication challenges, are used as responses to the authentication challenges. In one embodiment, a method is disclosed for determining authenticity of a security device of a component in an imaging device. The method includes receiving, by the security device, an authentication challenge including one or more commands and executing, by the security device, the one or more commands in response to receiving the authentication challenge. A magnetic field profile is generated based on current drawn by the security device from a power source while the security device is executing the one or more commands, the generated magnetic field profile indicating an authentication response of the security device to the authentication challenge for use in determining authenticity of the security device and, in turn, the component. Authentication may be one-way authentication where a component authenticates another component, mutual authentication where two components authenticate each other, or self-authentication where a component authenticates itself. In one aspect, a component is a controller of the imaging device or a supply item, such as a toner cartridge, of the imaging device.

In another embodiment, a method is disclosed for generating a response to an authentication challenge for determining authenticity of a component in an imaging device. The method includes receiving, by the component, an authentication challenge including one or more commands and executing, by the component, the one or more commands included in the authentication challenge in response to receiving the authentication challenge, wherein the component draws current from a power source while executing the one or more commands. A magnetometer, placed a distance from a conductor carrying the current drawn by the component while executing the one or more commands, measures a magnetic field around the conductor and a magnetic field profile is generated based on the measured magnetic field. The generated magnetic field profile is then used as a response to the authentication challenge.

In another embodiment, a device in a component for use in determining authenticity of the component in an imaging device is disclosed. The device includes a security device and a magnetometer device. The security device is electrically connected to a power source that delivers current to the security device via a conductor when the security device executes one or more commands included in an authentication challenge in response to the security device receiving the authentication challenge. The magnetometer device is positioned a distance from the conductor that carries the current being delivered from the power source to the security device when the security device executes the one or more commands. The magnetometer device is operative to measure a magnetic field around the conductor when the security device executes the one or more commands to generate a magnetic field profile indicating an authentication response of the security device to the authentication challenge.

DETAILED DESCRIPTION OF THE ILLUSTRATED EMBODIMENTS

The present disclosure provides methods to authenticate supply items using security chips based on the magnetic field profile that is generated when a security device draws current while executing a command in response to an authentication challenge. Because the magnetic field around a conductor is known to be proportional to the current flowing in a conductor and because this unique physical characteristic is relatively difficult to copy or emulate, capturing a magnetic field profile and using it as part of an authentication process may greatly improve the ability to authenticate genuine supply items even when security chips have been reverse engineered and copied to produce unauthentic supply items that exhibit the same digital behavior as with genuine supply items.

Figure 1:
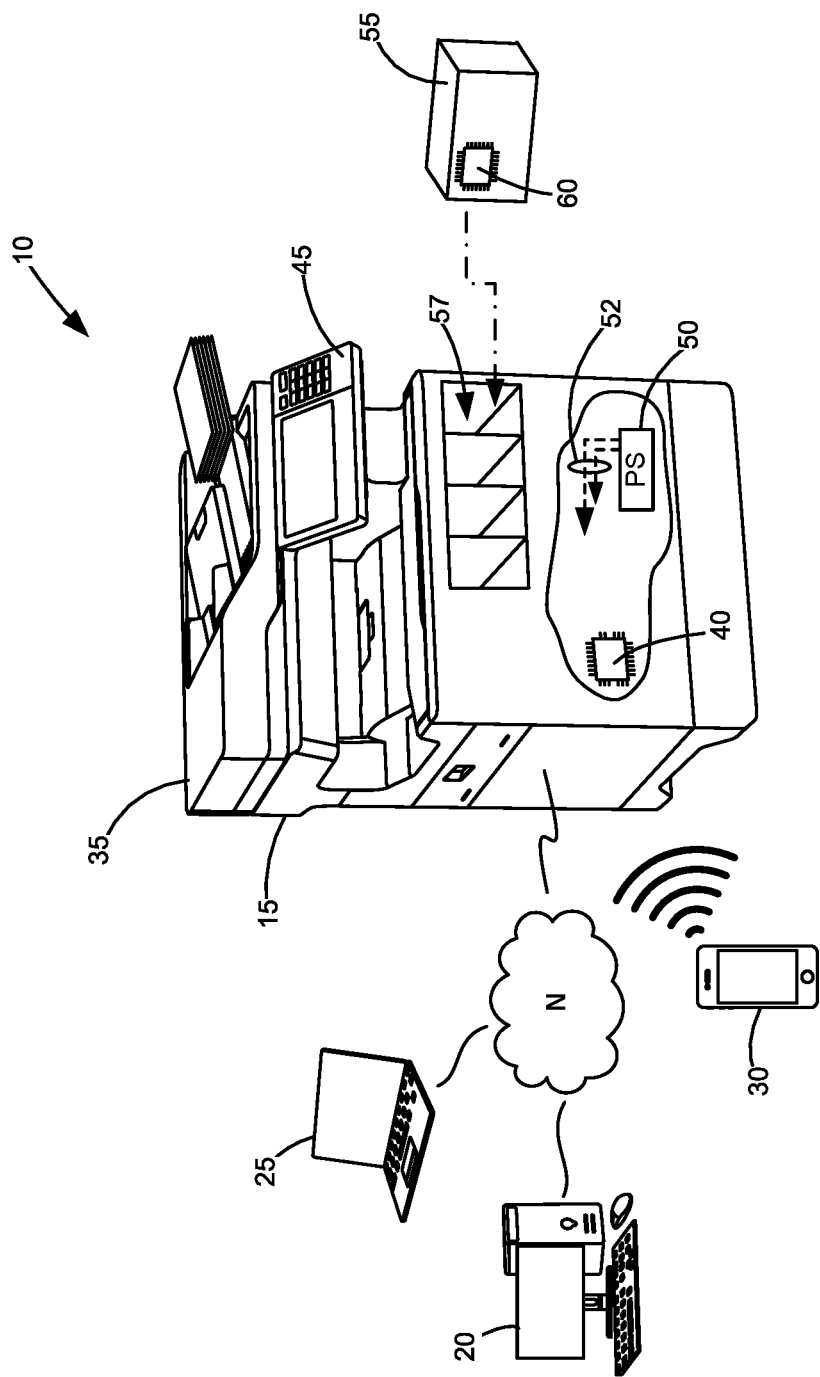
FIG. 1 illustrates an imaging system according to one example embodiment.

With reference to FIG. 1, a diagrammatic view of an imaging system 10 is shown according to an example embodiment. Imaging system 10 includes an imaging device 15 used for printing images on sheets of media. Image data of the image to be printed on a media sheet may be supplied to imaging device 15 from a variety of sources such as a computer 20, laptop 25, mobile device 30, scanner 35, or like computing device. The sources directly or indirectly communicate with imaging device 15 via wired and/or wireless connections. Imaging device 15 includes a controller 40, a user interface 45, and a power supply unit 50. Controller 40 may include a processor and associated memory. In some example embodiments, controller 40 may be formed as one or more Application Specific Integrated Circuits (ASICs) or System-on-Chips (SoCs). Controller 40 may control the processing of print data. Controller 40 may also control the operation of a print engine during printing of an image onto a sheet of media. Power supply unit 50 typically includes analog circuitry necessary to convert AC voltage from the AC mains to one or more regulated DC voltages for use by components of imaging device 15. Power supply unit 50 may deliver appropriate regulated DC voltage levels to various components and circuitries via a power bus 52.

In one example embodiment, imaging device 15 employs an electronic authentication scheme to authenticate consumable supply items and/or replaceable units installed in imaging device 15. In FIG. 1, a representative replaceable unit or supply item 55, such as a toner cartridge, an imaging unit, a fuser, an intermediate transfer unit, a waste toner box, etc., is shown. Supply item 55 may be installed in a corresponding storage area 57 in imaging device 15. Supply item 55 includes an integrated circuit chip or security device 60 that communicates with controller 40 in imaging device 15. Controller 40 may initiate authentication challenges to verify authenticity of supply items 55. The authenticity is verified if the supply item 55 being authenticated generates an expected response to an authentication challenge. Otherwise, the supply item 55 may be detected as a clone or counterfeit and appropriate actions may be taken to protect against the use of supply item 55 in order to optimize performance of and/or prevent damage to imaging device 15.

Figure 2:
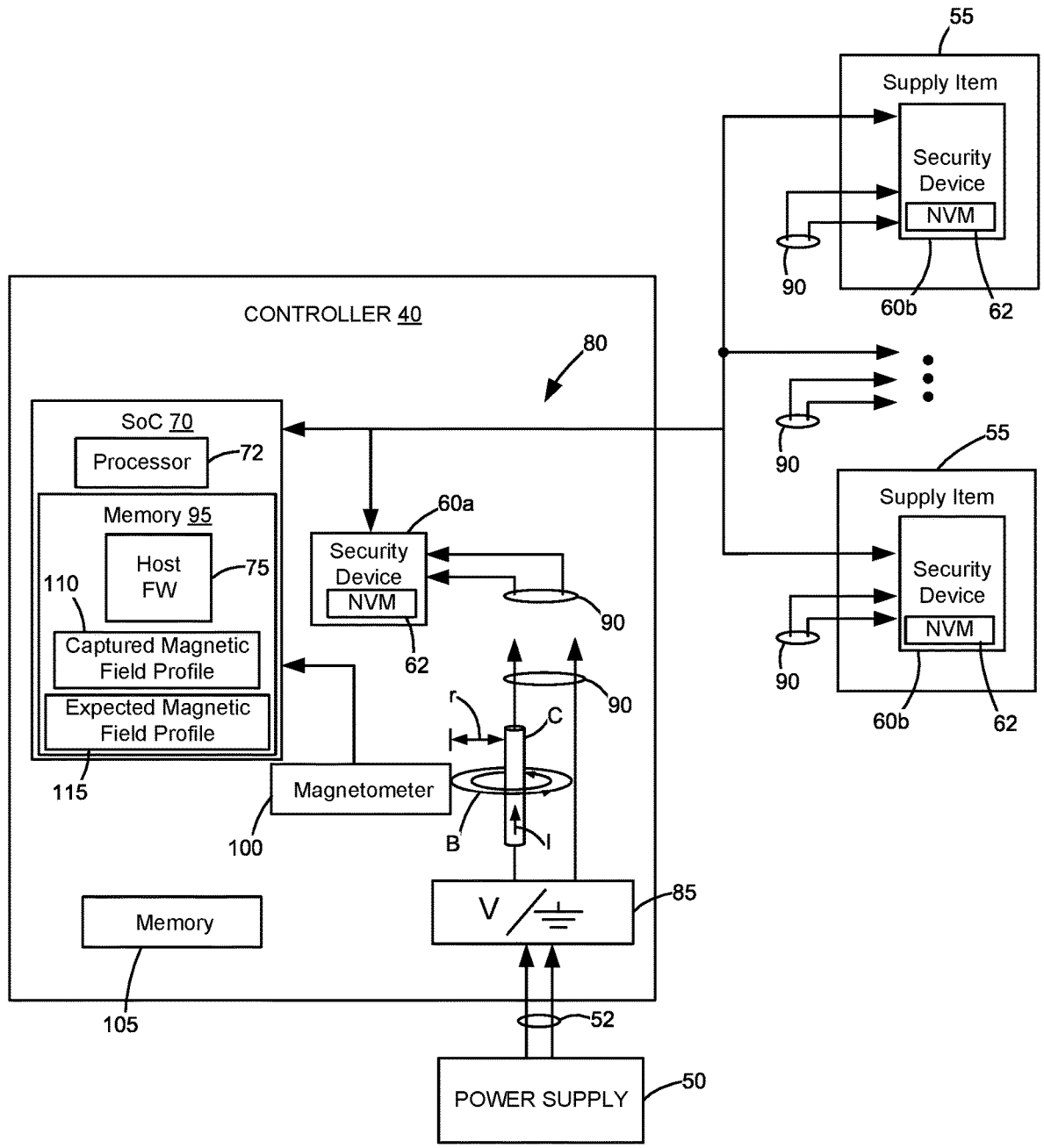
FIG. 2 is a block diagram illustrating communication between a controller and a plurality of supply items according to one example embodiment.

FIG. 2 is a block diagram illustrating communication between controller 40 and a plurality of supply items 55. In the embodiment illustrated, controller 40 includes a System-on-Chip (SoC) 70 including a processor 72. Security devices 60 are placed on supply item(s) 55 and on controller 40. The security devices are generally designated as security devices 60, but the security device placed on controller 40 may be referred to herein as system security device 60a and each security device placed on each supply item 55 may be referred to herein as supply item security device 60b for ease of description. Controller 40 also includes a power source 85, shown as a voltage regulator or voltage/ground source, that receives power from power supply unit 50 and delivers power to security devices 60 via a power bus 90. As a result, security devices 60 operate by drawing power from power source 85.

In one embodiment, host firmware 75 running in SoC 70 is configured to initiate authentication methods for validating authenticity of one or more of security devices 60. SoC 70 is configured to verify authenticity of security devices 60 in imaging device 15 using information associated with a magnetic field profile that is generated when a security device 60 draws current from power source 85 to perform an operation in response to receiving an authentication challenge. In this example, the authentication challenge may include one or more commands that results in the execution of one or more operations by the security device 60 that is to be authenticated.

As an example, when a security device 60 comprised of at least one integrated circuit (IC) is placed on supply item 55 in imaging device 15, it will consume current (I) from power source 85 that fluctuates because of the circuit switching activity resulting from the execution of one or more commands. The fluctuating current (I) drawn by the security device 60 will generate a fluctuating magnetic field (B) a distance (r) from the conductor (C) carrying the current (I). The amplitude of the magnetic field (B) is proportional to the current (I) divided by the distance (r) as shown by the following Equation (1):

$$B = \frac{\mu_0 I}{2\pi r} \quad \text{Eq. (1)}$$

where B is the magnetic field strength, I is the electric current flowing through the conductor, $\mu_0$ is the permeability of free space, and r is the distance from the conductor.

Several measurements of the fluctuating magnetic field amplitude (B) may be made over time to capture a magnetic field profile by placing a magnetometer device 100 a distance (r) from the conductor C carrying the current (I). The SoC 70 is configured to sample the output of magnetometer device 100 and generate a magnetic field profile based on the output of magnetometer device 100, and then store the generated magnetic field profile as a captured magnetic field profile 110 in memory 95 and use the captured magnetic field profile 110 as an authentication parameter.

The magnetometer device 100 used to capture a magnetic field profile may be constructed with any of magnetic field measurement technologies known in the art. For example, the magnetometer device 100 may include hall effect technology and magnetoresistance technology. The type of magnetometer device may be chosen so that its magnetic field measurement range and resolution matches the peak-to-peak amplitude of the magnetic field generated near the conductor carrying current to a security device 60. The magnetometer device may also be chosen so that it makes multiple measurements of the magnetic field along one or more axes (e.g., X and/or Y and/or Z) during a measurement interval that may begin upon detecting a configured trigger condition and end after a configured measurement duration.

SoC 70 is programmable to set at least one trigger condition to enable sampling from the output of magnetometer device 100. In one example, the execution by a security device 60 of a first operation of an authentication challenge may be set as a trigger condition. In another example, the trigger condition may be a logical operation (e.g., a simple event performed by SoC 70 or security device 60) or a series of logic operations (e.g., a complex series of events performed by SoC 70 or security device 60). In other examples, the trigger condition may be any signal communicated over the communications channel between SoC 70 and security devices 60.

The magnetic field profile of an authentic security device and the magnetic field profile of a non-authentic security device are expected to be different when captured as a response to an authentication challenge due to the differences in IC technology, circuit switching activity, and current fluctuation. As a result, a magnetic field profile may be captured during a measurement interval and used as a response to an authentication challenge, where the challenge consists of one or more commands executed by the security device 60 (such as, but not limited to, an encryption or decryption or verification command or a combination of commands, etc.) and where parameters stored in memory 62 are used to randomize the command (such as, but not limited to, a cipher type, key length, source data size, source data address, hash output size, operating frequency, number of iterations, measurement duration, measurement period, measurement resolution, etc.) as discussed in greater detail below. On the other hand, the magnetic field profile of each instance of an authentic security device (e.g., manufactured with the same mask set and same semiconductor process) in response to the same authentication challenge is expected to be similar due to the common integrated circuit technology and circuit switching activity and similar current fluctuation. This difference in magnetic field profiles may be determined and used to authenticate security devices.

An authentication algorithm may be used to determine the authenticity of the security device 60 by comparing the captured magnetic field profile 110 with an expected magnetic field profile 115 of an authentic security device. The expected magnetic field profile 115 may be predetermined by characterization of multiple instances of an authentic security device and stored in memory 105 on controller 40 during manufacturing. During use of imaging device 15, predetermined magnetic field profiles stored in memory 105 may be read into memory 95 on SoC 70. Alternatively, the expected magnetic field profile 115 may be dynamically determined by capturing a magnetic field profile from another instance of the authentic security device 60 placed on the controller 40 that is trusted. The authentication algorithm may be a simple equal to or greater than authenticity test or it may be a more complex statistical correlation test (such as the Pearson Correlation Coefficient) with a predetermined correlation threshold used to determine authenticity of the security device 60. The security device 60 on the supply item 55 or on the controller 40 is determined to be authentic if the result of the comparison exceeds the predetermined threshold and is determined to be non-authentic if the results of the comparison do not exceed the predetermined threshold. Alternatively, reverse logic may be used for the comparison as desired. Host SoC 70 may command any of security devices 60 to generate an authentication challenge and send the generated authentication challenge to any of the other security devices 60. Accordingly, the authentication protocol may be any combination of one-way authentication, mutual authentication, and self-authentication, as discussed in greater detail below.

Figure 3:
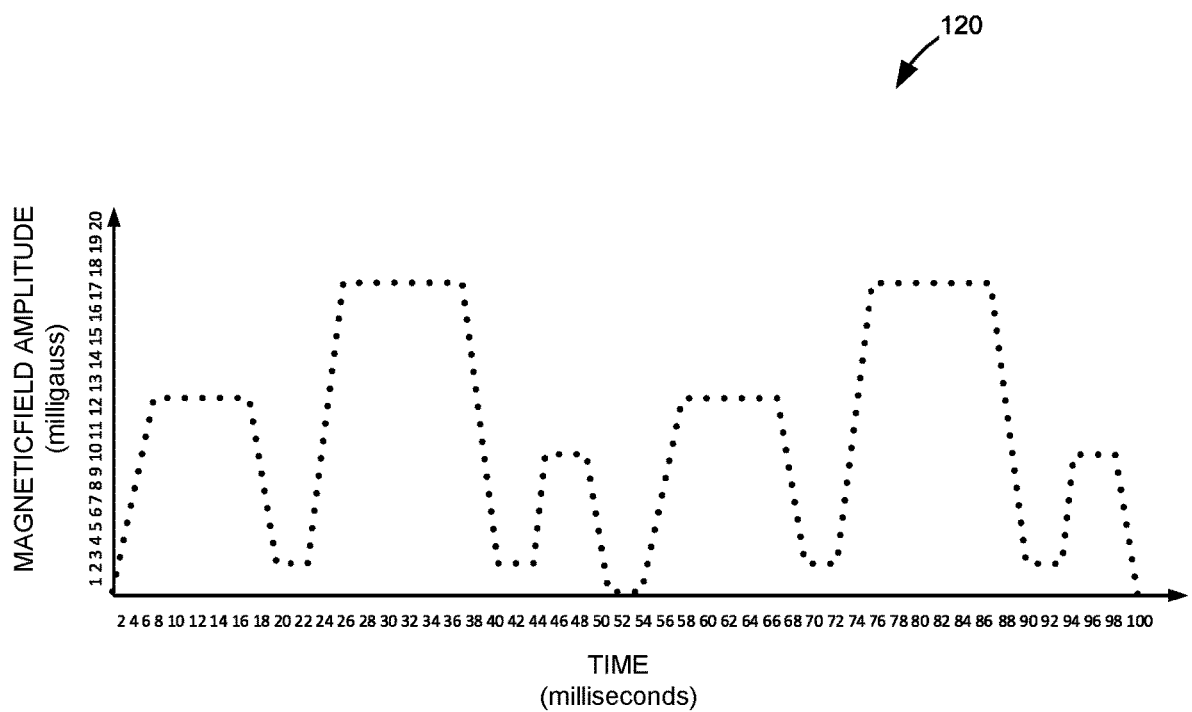
FIG. 3 is a graph illustrating an example magnetic field profile that is generated by an authentic security device in response to an authentication challenge.

FIG. 3 shows an example magnetic field profile 120 that is generated by an authentic security device as a response to an authentication challenge where discrete samples of magnetic field amplitudes are represented by the "dots" in the graph over a 100 millisecond measurement interval. In this example, the magnetic field profile 120 is generated when security device 60 draws current from power source 85 to perform operations in response to receiving an authentication challenge consisting of an EncDecVer command (defined herein as a combination of an encryption, decryption, and verification operation) that is randomized by parameters (e.g., parameters 1-7 listed below) stored in memory 62 of the security device 60. Hereinafter, the magnetic field profile that is generated and captured as a result of a security device drawing current from power source 85 to perform one or more operations in response to an authentication challenge may also be referred to as a magnetic field profile response 110. The magnetic field profile response 110 is measured by magnetometer device 100 that is configured with parameters (e.g., parameters 8-10 listed below) stored in memory 62 of the security device 60. Each command in an authentication challenge may be defined to use one or more parameters that may be fixed or frequently changed (e.g., each time the security device 60 is authenticated). It should be noted, however, that the command, parameters, operations, configuration, and measurements described herein are only illustrative as many variations of the components of this invention may be defined and used as an authentication challenge to generate a response consisting of a fluctuating magnetic field that may be measured over time and captured as a magnetic field profile and used to authenticate security devices.

Command: EncDecVer
    Parameter (1) Cipher Type: RSA
    Parameter (2) Key Length: 2048-bit
    Parameter (3) Source Data Size: 256-byte
    Parameter (4) Source Data Address: 0
    Parameter (5) Hash Output Size: 256-bit
    Parameter (6) Operating Frequency: 10 Mhz
    Parameter (7) Number of Iterations: 2
    Parameter (8) Measurement Duration: 100 milliseconds
    Parameter (9) Measurement Period: 1 millisecond
    Parameter (10) Measurement Resolution: 16-bits An authentic security device generates an authentic magnetic field profile response 110 by using the parameters stored in the internal memory, shown as non-volatile memory (NVM) 62, of the security device 60 to configure the security device 60 (e.g., the security device's operating frequency, etc.) and randomize the authentication challenge command executed by the security device 60 (e.g., cipher type, key length, source data size, source data address, hash output size, number of iterations, etc. of the authentication challenge command). As an example, with an EncDecVer challenge command that is randomized by parameters 1-7 listed above, the authentication challenge results in the execution by the security device of the following operations:

Operation (1): Encrypt, using RSA-2048 (Cipher Type and Key Length parameters), 256 bytes (Source Data Size parameter) of source data located in internal memory of the security device starting at address 0 (Source Data Address parameter) and store the 256-byte encrypted result in internal memory of the security device starting at address 256 (Source Data Address plus the Source Data Size parameters).

Operation (2): Decrypt, using RSA-2048 (Cipher Type and Key Length parameter), the 256-byte encrypted result starting at address 256 (Source Data Address plus Source Data Size parameters) and store the 256-byte decrypted result in internal memory of the security device starting at address 256 (Source Data Address plus Source Data Size parameters).

Operation (3): Verify that the original 256 bytes (Source Data Size parameter) of source data located in internal memory of the security device starting at address 0 (Source Data Address parameter) matches the 256-byte decrypted result located in internal memory of the security device starting at address 256 (Source Data Address plus Source Data Size parameters) using the SHA algorithm to generate the 256-bit hash output (Hash Output Size parameter) for each of the original source data and the decrypted result, and compare the two hash outputs to verify the result. Securely communicate the result of the verification to the SoC 70.

Operation (4): Repeat Operation (1), (Number of Iterations parameter).

Operation (5): Repeat Operation (2), (Number of Iterations parameter).

Operation (6): Repeat Operation (3), (Number of Iterations parameter).

In this example, the authentication challenge includes commands that results in the execution of six operations (Operations 1-6) by the security device 60 including two iterations of three sequential operations (Operations 1-3) that generates the magnetic field profile response 110 measured by the magnetometer device 100 when configured with the parameters stored in the security device (e.g., measurement period, resolution, etc.). The magnetic field measurements are captured during a measurement interval (e.g., beginning with a trigger condition and ending after the measurement duration, etc.) and stored in memory as the captured magnetic field profile 110.

In this example, the fluctuating current drawn by the unique circuit switching activity of the authentic security device, when executing the six operations defined by the authentication challenge, generates a fluctuating magnetic field near the conductor carrying current to the security device 60. In the above example, the magnetic field is measured by the magnetometer device 100 every 1 millisecond (as defined by Measurement Period of Parameter 9 above) starting with the execution of the first operation of the challenge (defined in this example as the trigger condition) and continuing for 100 milliseconds (as defined by Measurement Duration of Parameter 8 above), which may be approximately the time it takes to complete the execution of the last operation of the challenge. The magnetic field profile response is captured and stored in memory as a dataset of 100 16-bit (as defined by Measurement Resolution of Parameter 10 above) magnetic field amplitude measurements.

The expected magnetic field profile response may be predetermined by characterizing several responses of authentic security devices to the authentication challenge command and parameters, and then storing the expected magnetic field profile response as a predetermined magnetic field profile in memory on the controller 40 or on the security device 60. Alternatively, the expected magnetic field profile response may be dynamically generated and captured from another instance of the same security device that is trusted (e.g., system security device 60a placed on the controller 40 in imaging device 15). When the expected magnetic field profile response is predetermined, it may be combined with other device specific information (such as a serial number of a supply item) and signed with a digital signature algorithm (such as Elliptic Curve Digital Signature Algorithm or ECDSA) and encrypted with an encryption algorithm (such as Advanced Encryption Standard or AES). Both signature and encrypted result may be stored in the NVM memory 105 on the controller 40 or on the supply item 55.

Figure 4:
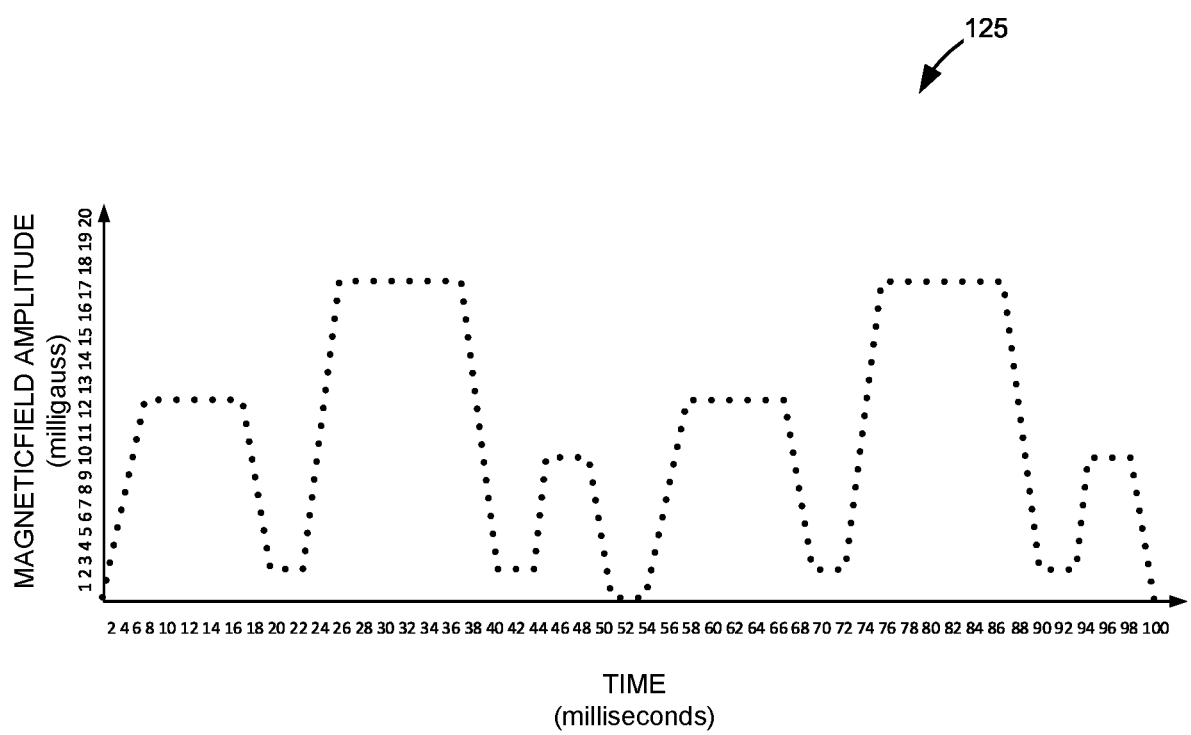
FIG. 4 is a graph illustrating an example expected magnetic field profile of an authentic security device.

FIG. 4 shows an example expected magnetic field profile 125 of an authentic security device 60. In this example, the expected magnetic field profile response is dynamically generated by capturing the magnetic field profile response of the trusted system security device 60a on the controller 40 in imaging device 15 when it executes the same authentication challenge (e.g., EncDecVer command and parameters) as previously described. The magnetic field generated by the trusted system security device 60a is measured by the magnetometer device 100 in the same way as previously described (e.g., 100 magnetic field amplitude measurements spaced 1 millisecond apart starting with the execution of the first operation of the challenge and ending after the completion of the last operation of the challenge) and the expected magnetic field profile response is captured and stored in memory as a dataset of 100 16-bit magnetic field amplitude measurements.

The magnetic field profile responses of authentic security devices (e.g., security devices manufactured with same mask set in the same semiconductor process) are expected to vary slightly due to part to part manufacturing variation, but they will show a high degree of statistical correlation when the actual magnetic field profile response of an authentic security device is compared with the expected magnetic field profile response of an authentic security device using, for example, an authentication algorithm such as the Pearson Correlation Coefficient. In the above example, the magnetic field profile 120 (FIG. 3) generated by an authentic security device is relatively similar to the expected magnetic field profile 125 (FIG. 4) of an authentic security device. In some cases, matches between generated magnetic field profile of an authentic security device and the expected magnetic field profile may be close but not exact. To determine authenticity, a generated magnetic field profile must meet an acceptable level of similarity or closeness to an expected magnetic field profile. As an example, a predetermined threshold, such as a Pearson Correlation Coefficient of 0.8 or greater, may be used for authentication. In this example, a resulting statistical correlation value less than the threshold of 0.8 indicates a weaker strength of association between the captured magnetic field profile response and the expected magnetic field profile response, whereas a resulting statistical correlation value greater than or equal to the threshold of 0.8 indicates a stronger strength of association between the captured magnetic field profile response and the expected magnetic field profile response. If the result of the correlation between the captured magnetic field profile response of an authentic security device and the expected response of an authentic security device passes the predetermined threshold, the authentic security device may be identified and authenticated. In this example, the result of the correlation between the captured magnetic field profile response of an authentic security device, shown in FIG. 3, and the expected response of an authentic security device, shown in FIG. 4, passes the predetermined threshold.

However, a non-authentic security device is expected to have circuit switching and current consumption characteristics that vary significantly from an authentic security device when executing the same authentication challenge command and parameters due to the differences in circuit construction and semiconductor process technology. These differences may manifest themselves in a magnetic field profile response of a non-authentic security device that will not be statistically correlated with the expected magnetic field profile response of an authentic security device using the same predetermined threshold. For example, a non-authentic security device with these differences in circuit construction and semiconductor process technology may generate a magnetic field profile 130 illustrated in FIG. 5 in response to the same authentication challenge (e.g., EncDecVer command and parameters) as previously described. The magnetic field of the non-authentic security device is measured by the magnetometer device 100 in the same way as previously described (a total of 100 magnetic field amplitude measurements spaced 1 millisecond apart starting with the execution of the first operation of the challenge and ending after the completion of the last operation of the challenge) and the magnetic field profile response is captured and stored in memory as a dataset of 100 16-bit magnetic field amplitude measurements.

Figure 5:
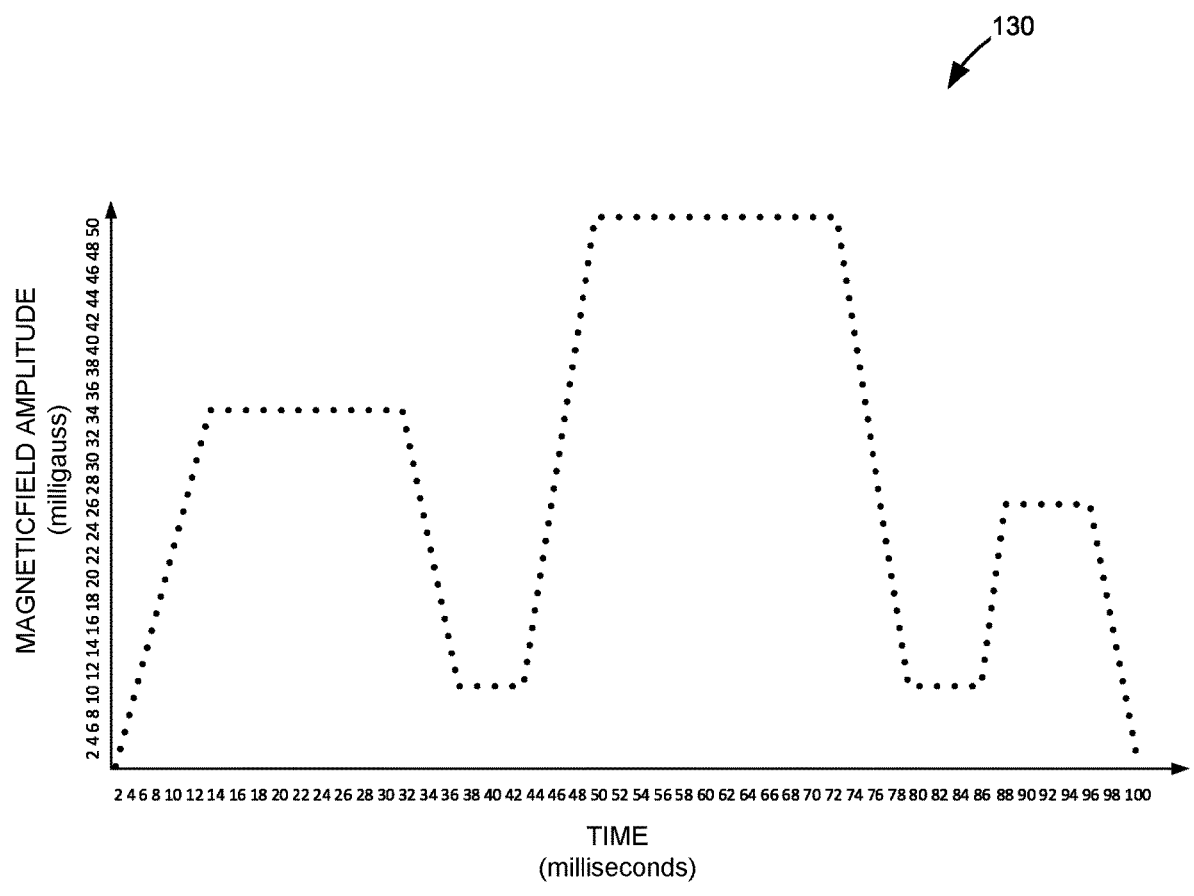
FIG. 5 is a graph illustrating an example magnetic field profile that is generated by a non-authentic security device.

In this example, a non-authentic security device will not be able to generate a magnetic field profile response with sufficient accuracy to produce a high degree of statistical correlation when the magnetic field profile response of the non-authentic security device is compared with the expected magnetic field profile response of an authentic security device using an authentication algorithm such as the Pearson Correlation Coefficient. FIG. 5 shows an example magnetic field profile response 130 from a non-authentic security device which deviates from the expected magnetic field profile 125 shown in FIG. 4. In this case, the result of the correlation between the magnetic field profile response of the non-authentic security device shown in FIG. 5 and the expected magnetic profile response of an authentic security device shown in FIG. 4 will not pass the predetermined threshold, such as the Pearson Correlation Coefficient 0.8 or greater, used for authentication and the non-authentic security device may be identified and not be authenticated.

The following describes, in summary, different elements of the invention that may be used to authenticate a security device based on a captured magnetic field profile in response to an authentication challenge as described above.

1) Place a magnetometer IC that can measure a magnetic field near a conductor carrying current from a voltage regulator to a security device IC.
2) Place a security device IC that will draw current and generate a magnetic field near the conductor carrying the current to the security device IC on a supply item and on the controller.
3) Program and configure the magnetometer IC to measure the magnetic field near the conductor carrying the current to the security device IC when a trigger signal is present.
4) Program and configure the security device IC to execute one or more commands with optional parameters that will cause it to consume current over a measurement interval.
5) Define a measurement interval that begins with a programmable trigger condition and continues for a programmable duration to coincide with the execution time in whole or part of one or more commands executed by the security device IC.
6) Trigger the security device IC to execute one or more commands and simultaneously trigger the magnetometer IC to measure the magnetic field during the measurement interval.
7) Capture the magnetic field profile measured by the magnetometer IC during the measurement interval and store it in memory.
8) Compare the captured magnetic field profile with the expected magnetic field profile (predetermined and stored in memory or dynamically captured from the system security device) using a suitable authentication algorithm.
9) Determine that the security device IC is authentic if the result of the comparison of the captured magnetic field profile and expected magnetic field profile is greater than or equal to a predefined threshold. Otherwise, determine that the security device IC is non-authentic.
10) Perform a predetermined enforcement action if the security device IC is determined to be authentic and perform another predetermined enforcement action if the security device IC is determined to be non-authentic.

Various embodiments of the methods will now be described, but the examples provided should not be viewed as exhaustive as there are many embodiments that may be used to authenticate security devices using magnetic field-based authentication and all combinations of these elements are considered embodiments herein. Additionally, many different authentication algorithms (such as Pearson Correlation Coefficient) and predetermined thresholds may be used to authenticate security devices and these authentication algorithms may be performed by firmware executing on a security device or an SoC. Further, the authentication of security devices disclosed herein may use one-way authentication protocol, mutual-authentication protocol, or self-authentication protocol in any of the following ways.

A security device on a controller may authenticate a security device on a supply item (one-way authentication).

A security device on a supply item may authenticate a security device on a controller (one-way authentication).

A security device on a controller and a security device on a supply item may authenticate each other (mutual authentication).

A security device on a first supply item may authenticate another security device on a second supply item (one-way authentication).

A security device on a first supply item and another security device on a second supply item may authenticate each other (mutual authentication).

A security device on a controller may authenticate itself (self-authentication).

A security device on a supply item may authenticate itself (self-authentication).

Figure 6:
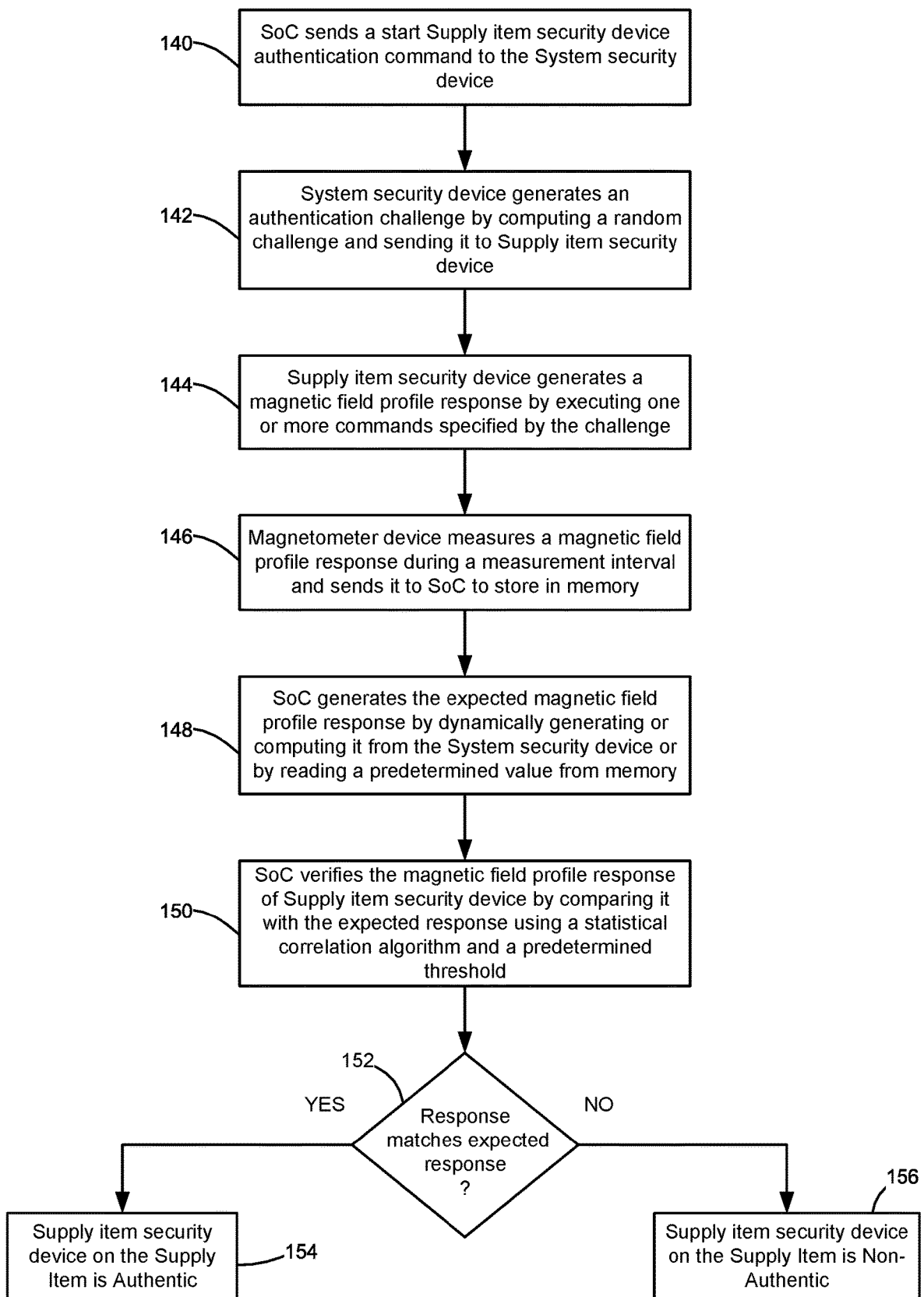
FIG. 6 is a flowchart illustrating an example method of one-way authentication where a security device on a controller authenticates a security device on a supply item, according to one example embodiment.

FIG. 6 illustrates an example method of one-way authentication where system security device 60a on controller 40 authenticates a supply item security device 60b on a supply item 55. At block 140, SoC 70 sends a start authentication command to system security device 60a for system security device 60a to initiate authentication of a supply item security device 60b. In response to receiving the start authentication command from SoC 70, system security device 60a generates an authentication challenge/command and sends the authentication challenge/command to the supply item security device 60b that is to be authenticated at block 142. In one example, system security device 60a generates the authentication challenge/command by computing a random challenge which may consist of one or more commands, such as (but not limited to) an encryption, decryption, or verification command, or a complex command consisting of a combination of multiple individual commands. Each command may be selected randomly from a predetermined set of commands and randomized using parameters stored in memory. Alternatively, each command may be generated randomly by using other parameters such as (but not limited to) cipher type, key length, source data size, source data address, hash output size, operating frequency, number of iterations, etc., to modify and randomize a predetermined command.

At block 144, supply item security device 60b generates a magnetic field profile response by executing the one or more commands specified by the authentication challenge/command. The magnetometer device 100 measures the generated magnetic field profile response during a measurement interval as the supply item security device 60b draws current from the power source while executing the one or more commands, and then sends the measured magnetic field profile response to the SoC 70 to store in memory as a captured magnetic profile response at block 146.

At block 148, SoC 70 generates an expected magnetic profile response by dynamically generating or computing the expected magnetic field profile response from the system security device 60a or by reading a predetermined value from memory 105. For example, the expected magnetic field profile response may be generated by reading from a predetermined finite number of expected magnetic field profile responses statically stored in non-volatile memory 105 on the controller 40 or on the security device 60. Alternatively, the expected magnetic field profile responses may be stored in a cloud database indexed by a finite size hash of device specific information and accessed by the controller 40 through a secure network connection. In another example, where a security device on the controller 40 and a security device on the supply item 55 are instances of the same security device, the expected magnetic field profile response of a first security device to an authentication challenge may be dynamically generated by generating the same magnetic field profile response of a second security device using the same authentication challenge and parameters as was used for the first security device. As an example, SoC 70 may command system security device 60a and supply item security device 60b to each generate a magnetic field profile response to an authentication challenge with the same parameters. SoC 70 may then measure each of the responses from the system security device 60a and supply item security device 60b and compare them. If system security device 60a is considered as the reference, the response from system security device 60a is set as the expected magnetic field profile response and the response from supply item security device 60b must match the response from system security device 60a within margins for supply item security device 60b to be considered authentic.

At block 150, SoC 70 verifies the actual magnetic field profile response of supply item security device 60b by comparing it with the expected response using a statistical correlation algorithm and a predetermined threshold. For example, the captured magnetic field profile response and the expected magnetic field profile response may be compared using Pearson correlation coefficients. With a Pearson correlation coefficient of 0.8 used as a predetermined threshold, for example, a correlation computation between the captured magnetic field profile response and the expected magnetic field profile response that results in a Pearson correlation coefficient below 0.8 may indicate a relatively weak relationship between the actual captured response and the expected response. On the other hand, a correlation computation between the captured response and the expected response that results in a Pearson correlation coefficient equal to or greater than 0.8 may indicate a relatively strong relationship between the actual response and the expected response.

At block 152, a determination is made whether the captured magnetic field profile response of supply item security device 60b matches the expected response. For instance, in the above example, it may be determined that the captured response does not match the expected response if the resulting Pearson correlation coefficient of the correlation computation is less than the predetermined threshold of 0.8. Otherwise, if the correlation computation results in a Pearson correlation coefficient that is greater than or equal to the predetermined threshold of 0.8, it may be determined that the actual response of the supply item security device 60b matches the expected response.

When it is determined at block 152 that the actual magnetic field profile response matches the expected response, an indication may be made that supply item security device 60b (and, consequently, supply item 55) is authentic at block 154. Otherwise, when it is determined at block 152 that the actual response does not match the expected response, an indication may be made that supply item security device 60b (and, consequently, supply item 55) is non-authentic at block 156. One or more enforcement actions may be performed to protect against the use of the non-authentic supply item and/or prevent damage to imaging device 15. For example, the enforcement action may include preventing use of the non-authentic supply item in imaging device 15 and/or notifying the user that a non-authentic/unsupported supply item is installed.

Figure 7:
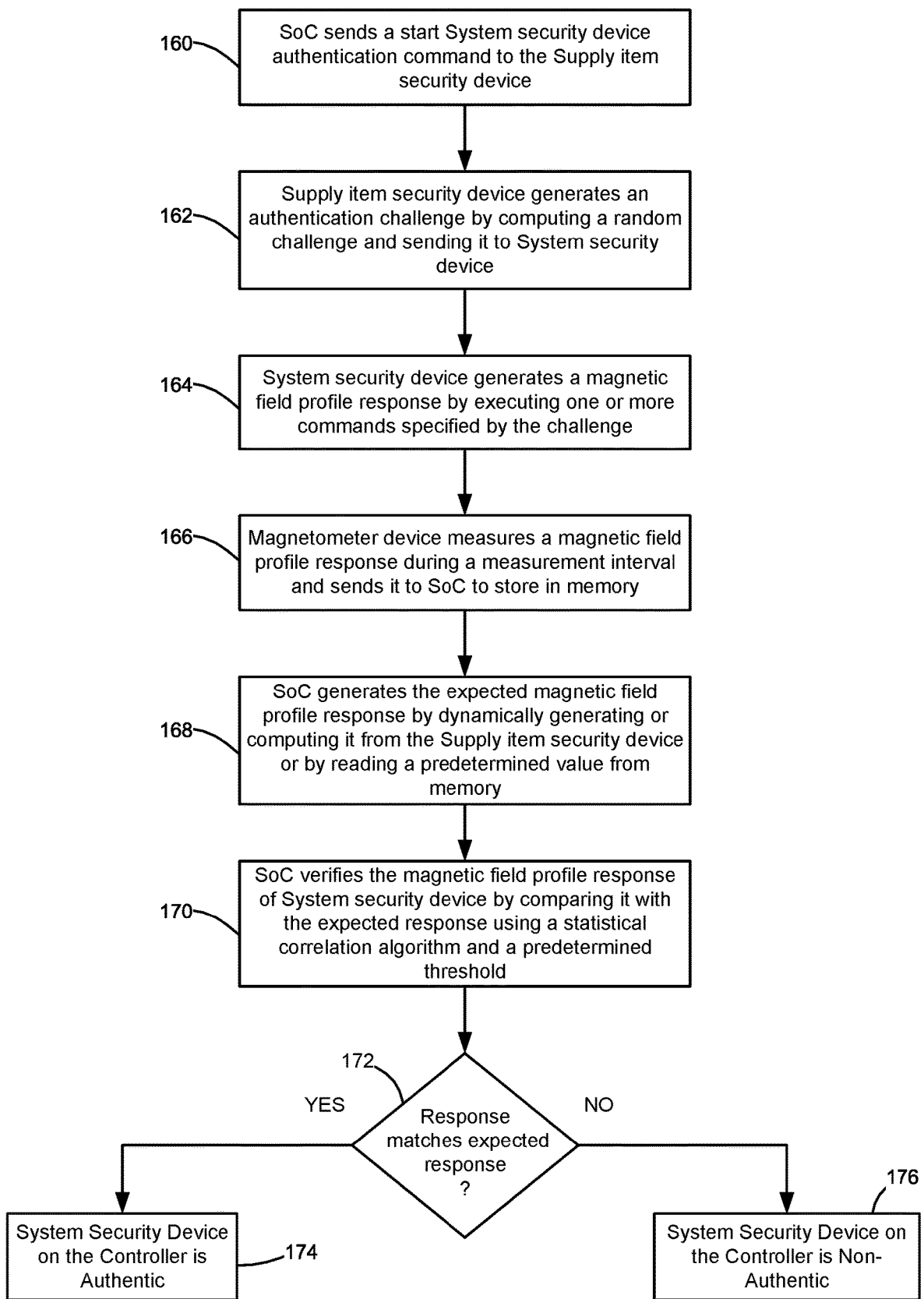
FIG. 7 is a flowchart illustrating an example method of one-way authentication where a security device on a supply item authenticates a security device on the controller, according to one example embodiment.

FIG. 7 illustrates an example method of one-way authentication where a supply item security device 60 on supply item 55 authenticates system security device 60 on controller 40. It is noted that the same techniques and operations described above with respect to FIG. 6 may be used in this example when applicable. At block 160, SoC 70 sends a start authentication command to a supply item security device 60b for supply item security device 60b to initiate authentication of system security device 60a. In response to receiving the start authentication command from SoC 70, supply item security device 60b generates an authentication challenge/command by computing a random challenge and sends the authentication challenge/command to system security device 60a at block 162.

Upon receiving the challenge from supply item security device 60b, system security device 60a generates a magnetic field profile response by executing one or more commands specified by the authentication challenge at block 164. The magnetometer device 100 measures the generated magnetic field profile response during a measurement interval as the system security device 60a draws current from the power source while executing the one or more commands, and then sends the measured magnetic field profile response to the SoC 70 to store in memory as a captured magnetic field profile response at block 166.

At block 168, SoC 70 generates an expected magnetic profile response by dynamically computing or generating the expected magnetic field profile response from the supply item security device 60b or by reading a predetermined value from memory 105 in the same manner as discussed above with respect to FIG. 6. In another example, for instances where security devices 60 are instances of the same security device, a second security device may be used to generate a magnetic field profile response to the same authentication challenge with the same parameters and such magnetic field profile response may be used as the expected response of the first security device that is to be authenticated.

At block 170, SoC 70 verifies the captured magnetic field profile response of system security device 60b by comparing it with the expected response using a statistical correlation algorithm and a predetermined threshold. At block 172, a determination is made whether the captured magnetic field profile response of system security device 60a matches the expected response. When it is determined at block 172 that the captured magnetic field profile response of system security device 60a matches the expected response, an indication may be made that system security device 60a (and, consequently, controller 40) is authentic at block 174. Otherwise, when it is determined at block 172 that the captured magnetic field profile response does not match the expected response, an indication may be made that system security device 60a (and, consequently, controller 40) is non-authentic at block 176. One or more enforcement actions may be performed to protect against the use of the non-authentic controller.

In the example shown in FIG. 7, one-way authentication is performed for instances where a supply item security device 60b on supply item 55 authenticates system security device 60a on controller 40. In other embodiments, SoC 70 may command a supply item security device 60a on supply item 55 to authenticate a supply item security device 60b on another supply item 55 (instead of system security device 60a on controller 40) by applying the same method discussed above with respect to FIG. 7. In particular, the supply item security device 60b on a first supply item 55 may generate an authentication challenge/command and send the authentication challenge/command to another supply item security device 60b on a second supply item 55. In turn, the supply item security device 60b on the second supply item 55 may generate a magnetic field profile response which is sent to SoC 70 for verification using the same techniques and operations discussed above.

Figure 8:
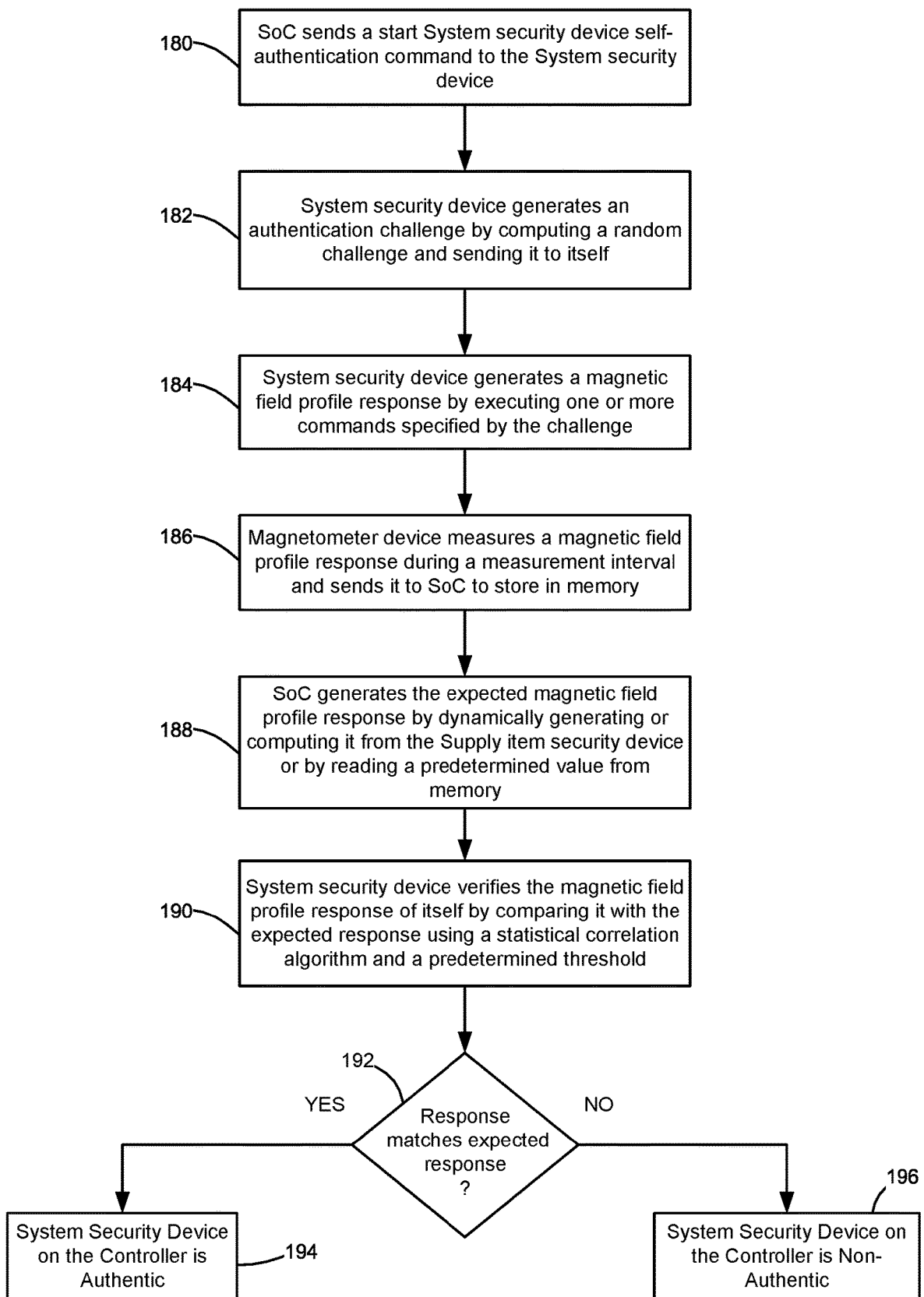
FIG. 8 is a flowchart illustrating an example method of self-authentication where a security device on the controller authenticates itself, according to one example embodiment.

FIG. 8 illustrates an example method of self-authentication where a system security device 60a on controller 40 authenticates itself. It is noted that the same techniques and operations described above with respect to FIGS. 6 and 7 may be used in this example when applicable. At block 180, SoC 70 sends a start authentication command to system security device 60*a* for system security device 60*a* to initiate self-authentication. In response to receiving the start authentication command from SoC 70, system security device 60*a* generates an authentication challenge/command by computing a random challenge and sends the authentication challenge to itself at block 182.

At block 184, system security device 60*a* generates a magnetic field profile response by executing one or more commands specified by the authentication challenge. The magnetometer device 100 measures the generated magnetic field profile response during a measurement interval as the system security device 60*a* draws current from the power source while executing the one or more commands, and then sends the measured magnetic field profile response to the SoC 70 to store in memory as a captured magnetic field profile response at block 186.

At block 188, SoC 70 generates an expected magnetic profile response by dynamically computing or generating the expected magnetic field profile response from a trusted security device 60, such as from a different security device (e.g., from one of supply item security devices 60*b*), or by reading a predetermined value from memory 105 in the same manner as discussed above with respect to FIGS. 6 and 7. At block 190, SoC 70 verifies the captured magnetic field profile response of system security device 60*a* by using the system security device 60*a* to compare the captured magnetic field profile response in whole or in part with the expected response using a statistical correlation algorithm and a predetermined threshold. At block 192, a determination is made whether the captured magnetic field profile response of system security device 60 matches the expected response. When it is determined at block 192 that the captured magnetic field profile response of system security device 60*a* matches the expected response, an indication may be made that system security device 60*a* (and, consequently, controller 40) is authentic at block 194. Otherwise, when it is determined at block 192 that the captured magnetic field profile response does not match the expected response, an indication may be made that system security device 60*a* (and, consequently, controller 40) is non-authentic at block 196. One or more enforcement actions may be performed to protect against the use of the non-authentic controller.

In the example shown in FIG. 8, self-authentication is performed by system security device 60*a* to authenticate itself. In other embodiments, the same method discussed above with respect to FIG. 8 may be applied by each supply item security device 60*b* on supply items 55 for authenticating itself.

As a result, the authentication of security devices using the magnetic field-based authentication methods discussed above may be used for one-way authentication (system security device 60*a* authenticates supply item security device 60*b* or vice versa) as illustrated in FIG. 6 or FIG. 7, mutual authentication (system security device 60*a* and supply item security device 60*b* authenticate each other) as illustrated in FIG. 6 and FIG. 7 together, or self-authentication (a security device 60 authenticates itself) as illustrated in FIG. 8.

Authentication schemes using magnetic field profiles have been described above that may be used to authenticate security devices 60. Presented below, with reference to FIGS. 9-14, are specific examples of devices and methods executed on imaging system 10 that may be used to authenticate security devices based on magnetic field profiles. In the examples shown, instances of the same security device 60 are placed on controller 40 and on each supply item 55. Each security device 60 may include a master (M) and/or slave (S) serial interface, a microcontroller (not shown), NVM 62, and other hardware security features. The NVM 62 in the security device 60 may contain firmware and data programmed at the factory that may be used for authenticating supply items. SoC 70 may directly communicate with system security device 60*a* while communication between SoC 70 and supply item security devices 60*b* may go through system security device 60*a*. In other embodiments, SoC 70 may directly communicate with all security devices 60 including system security device 60*a* and supply item security devices 60*b*.

Figure 9:
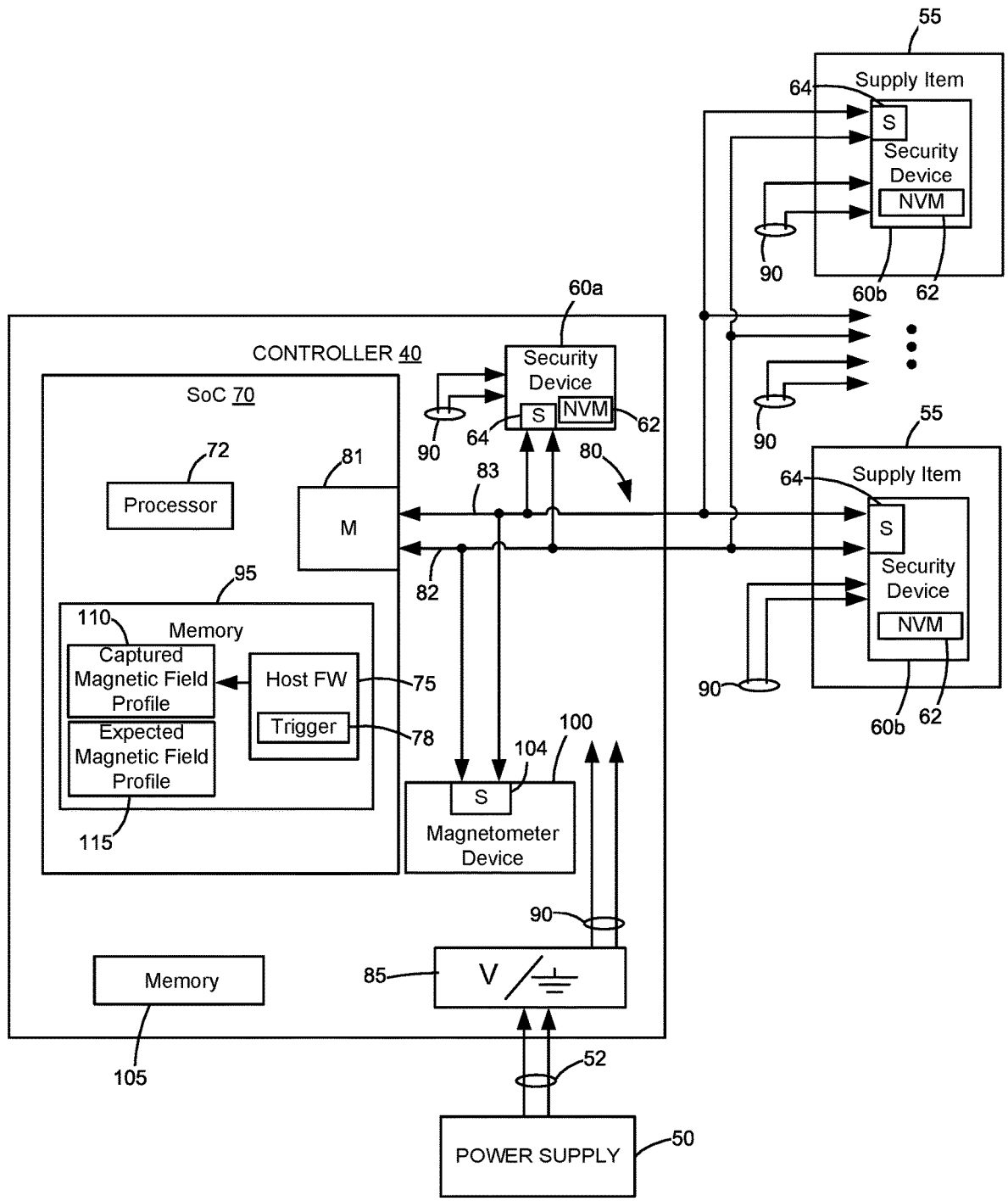
FIG. 9 is a block diagram of an example embodiment where a magnetometer device is placed on a controller.

In the embodiment shown in FIG. 9, SoC 70 communicates with security devices 60 and magnetometer device 100 via a shared bus system 80. Shared bus system 80 may employ the Inter-Integrated Circuit ("I2C") protocol, although many other protocols can be utilized. One wire 82 of shared bus 80 carries data in a bidirectional manner, and the other wire 83 carries clock signals to the security devices 60. While shared bus system 80 is illustrated as a two-wire serial bus, shared parallel bus structures or other wired structures may be utilized in other example embodiments.

SoC 70, memory 105, magnetometer device 100, power source/voltage regulator 85 and other devices (not shown) are placed on controller 40 and attached to imaging device 15. Memory 95 on the SoC 70 may contain host firmware 75 and data read from memory 105 on the controller 40 programmed at the factory that may be used for authenticating supply items 55. The master serial interface 81 of SoC 70 is connected to the slave serial interfaces 64 of the security devices 60 and to a slave serial interface 104 of the magnetometer device 100. SoC 70 reads parameters from memory 62, 95 or generates parameters randomly, and configures different devices in imaging system 10 including security devices 60 and magnetometer(s) 100.

Power supply 50 provides power to controller 40 that is regulated to an operating voltage by voltage regulator 85 that supplies current to security devices 60 on the controller 40 and on the supply items 55 through power bus 90 including one or more conductors that connect the security devices 60 to the voltage regulator 85. The magnetometer device 100 is located near a conductor of power bus 90 carrying current from the voltage regulator 85 to the security devices 60.

In the embodiment shown, magnetic field-based authentication begins with the SoC 70 commanding the system security device 60*a* to generate an authentication challenge that is sent to the supply item security device 60*b*. The supply item security device 60*b* responds to the challenge by executing one or more commands based on parameters included with the authentication challenge. In another embodiment, the supply item security device 60*b* may execute commands based on parameters stored in its NVM 62. When the supply item security device 60*b* executes the one or more commands, the supply item security device 60*b* generates a unique magnetic field profile near the conductor carrying the current drawn from the voltage regulator 85. The magnetic field profile is measured by the magnetometer device 100 at a programmed measurement resolution and operating frequency during a measurement interval beginning with the detection of a trigger condition 78 and continuing for a programmed measurement duration. The magnetometer device 100 sends the measured magnetic field profile to the SoC 70 over the serial interface where it is captured and stored in memory as a captured magnetic field profile 110 and used as the response to the authentication challenge.

The SoC 70 may then use an authentication algorithm to verify the response by comparing the captured magnetic field profile 110 with an expected magnetic field profile 115. As before, the expected magnetic field profile 115 may have been predetermined and stored in memory 105 or dynamically generated or computed by capturing the same magnetic field profile from the system security device 60a. If the result of the comparison is greater than or equal to a predetermined threshold for statistical correlation (such as using the Pearson Correlation Coefficient discussed above), the supply item security device 60b is determined to be authentic. Otherwise, if the result of the comparison is less than the predetermined threshold for statistical correlation, the supply item security device may be determined to be non-authentic. Each security device 60 on supply items 55 may be authenticated individually (one at a time) or collectively (more than one at a time) in any combination of 1 to N, where there are N security devices in imaging system 10. When security devices 60 are authenticated collectively, N at a time in parallel, where each security device takes T time to authenticate, there is a reduction in total authentication time from N*T to T. This 1/N reduction in total authentication time enables improvements in imaging device 15 specifications (e.g., time to first page) that are dependent on the total authentication time of all the security devices 60 in an imaging device 15.

In some embodiments, the measurement interval, frequency, and resolution may be based on unique parameters such as the trigger condition, measurement period, measurement duration and measurement resolution. Each of these commands and parameters may be stored in internal memory, such as NVM 62 of the security device 60, at the time of manufacture or received by secure communication from the system security device 60a.

A response consists of a captured magnetic field profile where two instances of the same security device (manufactured with the same mask set and same semiconductor process) may generate a similar response (captured magnetic field profile) to a challenge composed of the same command and parameters. In addition, two instances of the same security device may generate a different response (captured magnetic field profile) to a challenge composed of the same command and parameters. In this case, the use of additional secret parameters stored in each instance of an authentic security device (such as, but not limited to, an operating frequency divisor) may be used to modify parameters of the commands included in the challenge to change the manner in which the security device executes the commands which, in turn, can further randomize the response of an authentic security device. The response may be measured by magnetometer device 100 after it has been configured by the SoC 70 to measure a magnetic field profile with a measurement resolution and frequency beginning when a trigger condition is detected and ending after a measurement duration, and to communicate the response to the SoC 70 where it may be stored in memory. The magnetometer device 100 may be configured based on parameters stored in NVM 62 that determine the capture frequency, magnetic field range and magnetic field resolution. The magnetometer device 100 may be configured the same or differently for capturing the magnetic field profile for each security device 60.

One or more expected magnetic field profiles that represent all security devices collectively may be predetermined by characterization of several security devices and stored in the NVM memory 105 on the controller 40 or in the NVM 62 on the security device 60. In addition, one or more expected magnetic field profiles that represent a security device 60 individually may be predetermined by characterization of the security device and stored in NVM 62 on the security device. Furthermore, the predetermined magnetic field profiles may be combined with other device specific information (such as a serial number of a supply item 55) and signed with a digital signature algorithm (such as ECDSA) and encrypted with an encryption algorithm (such as AES) and both the digital signature and encrypted magnetic field profile may be stored in a non-volatile memory.

An expected magnetic field profile that represents all security devices collectively may be generated dynamically from the system security device 60a executing the same challenge and generating and capturing the same magnetic field profile as a response. This eliminates the need to store any expected magnetic field profile in the NVM 62. Because the system security device 60a and the supply item security device 60b are instances of the same design (manufactured with the same mask set and same semiconductor process), it is expected that the captured magnetic field profile of the system security device 60a will be highly correlated to the magnetic field profile of the supply item security device 60b and therefore suitable to use as the expected magnetic field profile to authenticate a supply item security device 60b.

Additional embodiments are described below, but these additional embodiments should not be viewed as exhaustive. It should also be understood that all previous descriptions may apply in whole or in part to these additional embodiments.

Figure 10:
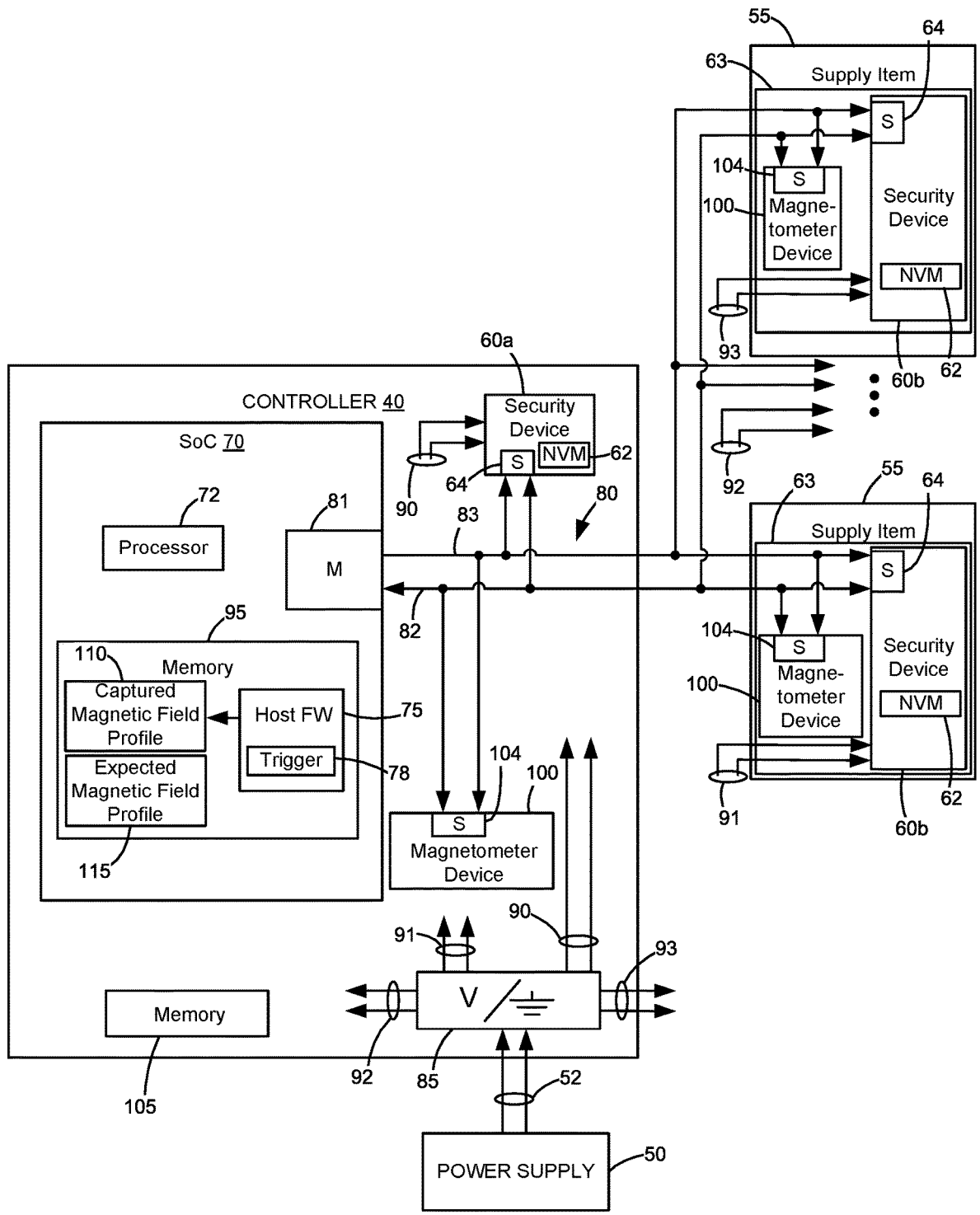
FIG. 10 is a block diagram of an example embodiment where plural magnetometer devices are placed on a controller and plural supply items.

In the embodiment shown in FIG. 10, all devices are placed, located, and connected as described in the embodiment shown in FIG. 9. However, in this embodiment, the magnetometer device 100 and the security device 60 are placed on the controller 40 and are combined on a printed circuit board (PCB) 63 and placed on one or more of the supply items 55. The master serial interface 81 of the SoC 70 is connected to the slave serial interfaces 64 of each security device 60 and to the slave serial interfaces 104 of each magnetometer device 100. Further, each security device 60 is connected to the voltage regulator 85 through individual corresponding current carrying conductors 90, 91, 92 and 93.

The authentication of supply items 55 using magnetic field profiles begins and proceeds as previously described above with respect to FIG. 9 with the difference that the magnetic field profile measurement for a security device 60 is made by a dedicated magnetometer device 100 located with the security device 60 on a supply item 55 or on the controller 40. Each magnetometer device 100 communicates the magnetic field measurement result to the SoC 70 over the serial interface where it is stored in memory as the captured magnetic field profile 110 for the security device 60. The SoC 70 may then use an authentication algorithm to verify the response as previously described to determine the authenticity of the security device on the supply item 55.

In this embodiment, security devices 60 can be authenticated using individual magnetic field profiles 1 to N at a time, where N is the total number of security devices (for example, one or more of security devices 60 may be authenticated substantially concurrently using one-way authentication, mutual authentication, or self-authentication). When security devices 60 are authenticated individually, N at a time in parallel, where each security device takes T time to authenticate, there is a reduction in total authentication time from N*T to T. This 1/N reduction in total authentication time enables improvements in imaging device 15 specifications (e.g., time to first page) that are dependent on total authentication time of all the security devices 60 in an imaging device 15. Further, as with the previous embodiment, secret parameters stored in the NVM of each security device may be used to cause each security device to execute authentication challenge commands differently to have a different magnetic profile response to the same authentication challenge.

Figure 11:
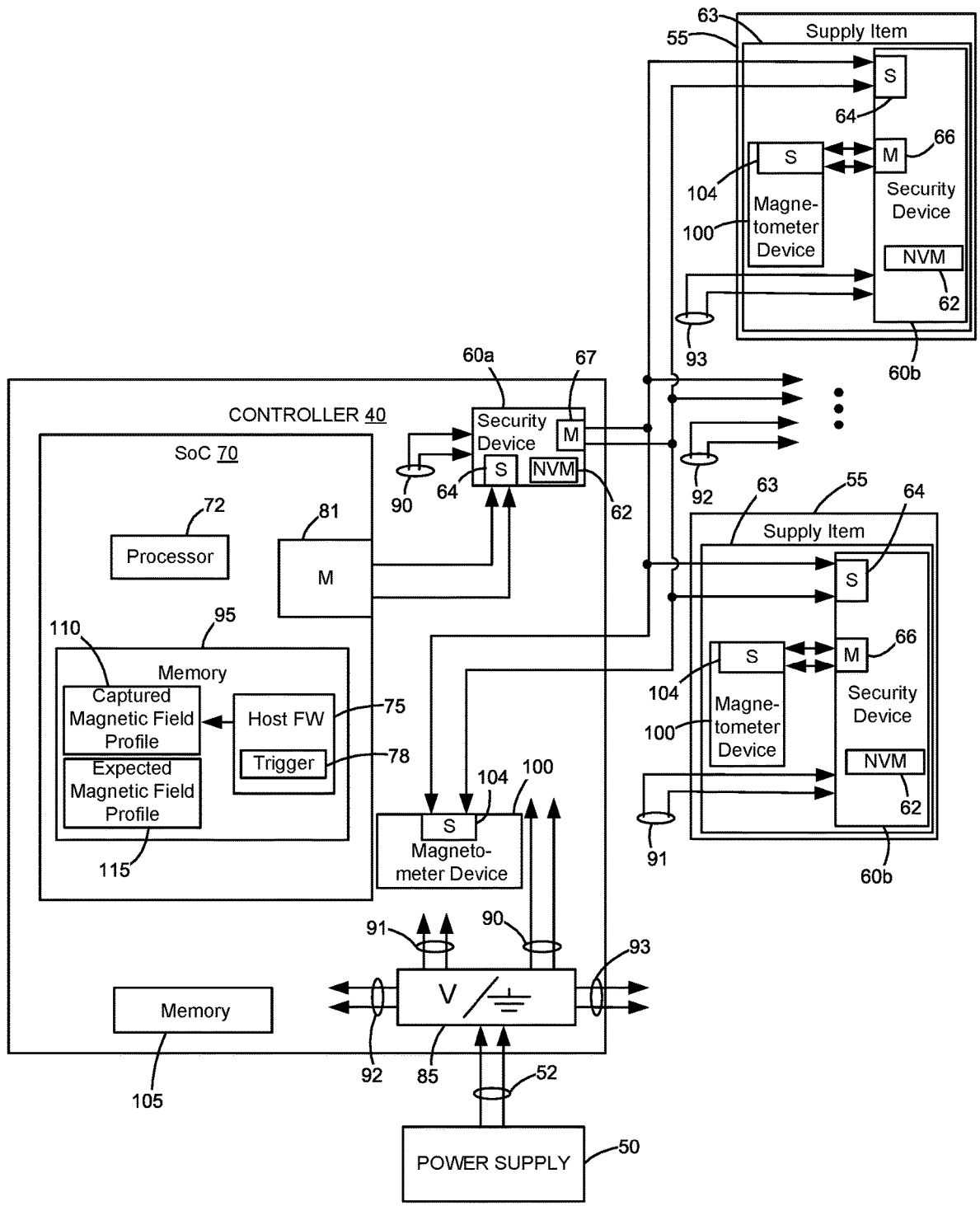
FIG. 11 is a block diagram of an example embodiment where plural magnetometer devices are placed on a controller and plural supply items, wherein each magnetometer device on a supply item communicates a magnetic field profile measurement to a co-located security device on the same supply item.

In the embodiment shown in FIG. 11, the magnetometer device 100 and the security device 60 are placed on the controller 40 and are combined on a printed circuit board (PCB) 63 and placed on one or more the supply items 55. The master serial interface 81 of the SoC 70 is connected to the slave serial interface 64 of the system security device 60a and the master serial interface 67 of the system security device 60a is connected to the slave serial interface 64 of each supply item security device 60b and to the slave interface 104 of the magnetometer device 100 on the controller 40. Further, the master serial interface 66 of each supply item security device 60b is connected to the slave serial interface 104 of the magnetometer device 100 on the supply item 55. Each security device 60 is connected to the voltage regulator 85 through corresponding individual current carrying conductors 90, 91, 92 and 93.

The authentication of supply items 55 using magnetic field profiles begins and proceeds as previously described above with the difference that the magnetic field profile measurement for a security device 60 is made by a dedicated magnetometer device 100 located with the security device 60 on a supply item 55 or on the controller 40. Each magnetometer device 100 communicates the magnetic field measurement result to the co-located security device 60 (on controller 40 or on supply item 55) over the master (66) and slave (104) serial interface connection between magnetometer device 100 and security device 60 where it is stored in memory as the captured magnetic field profile for the security device 60. Each security device 60 may then use an authentication algorithm to verify the response by comparing the captured magnetic field profile with the expected magnetic field profile as previously described to determine the authenticity of the security device 60 on the supply item 55 or on the controller 40.

In this embodiment, each security device 60 can authenticate itself (self-authentication) by receiving an authentication challenge from the system security device 60a, generating a response, measuring the response with a dedicated magnetometer, capturing the magnetic field profile response in memory, and verifying the response by executing the authentication algorithm on the security device.

Figure 12:
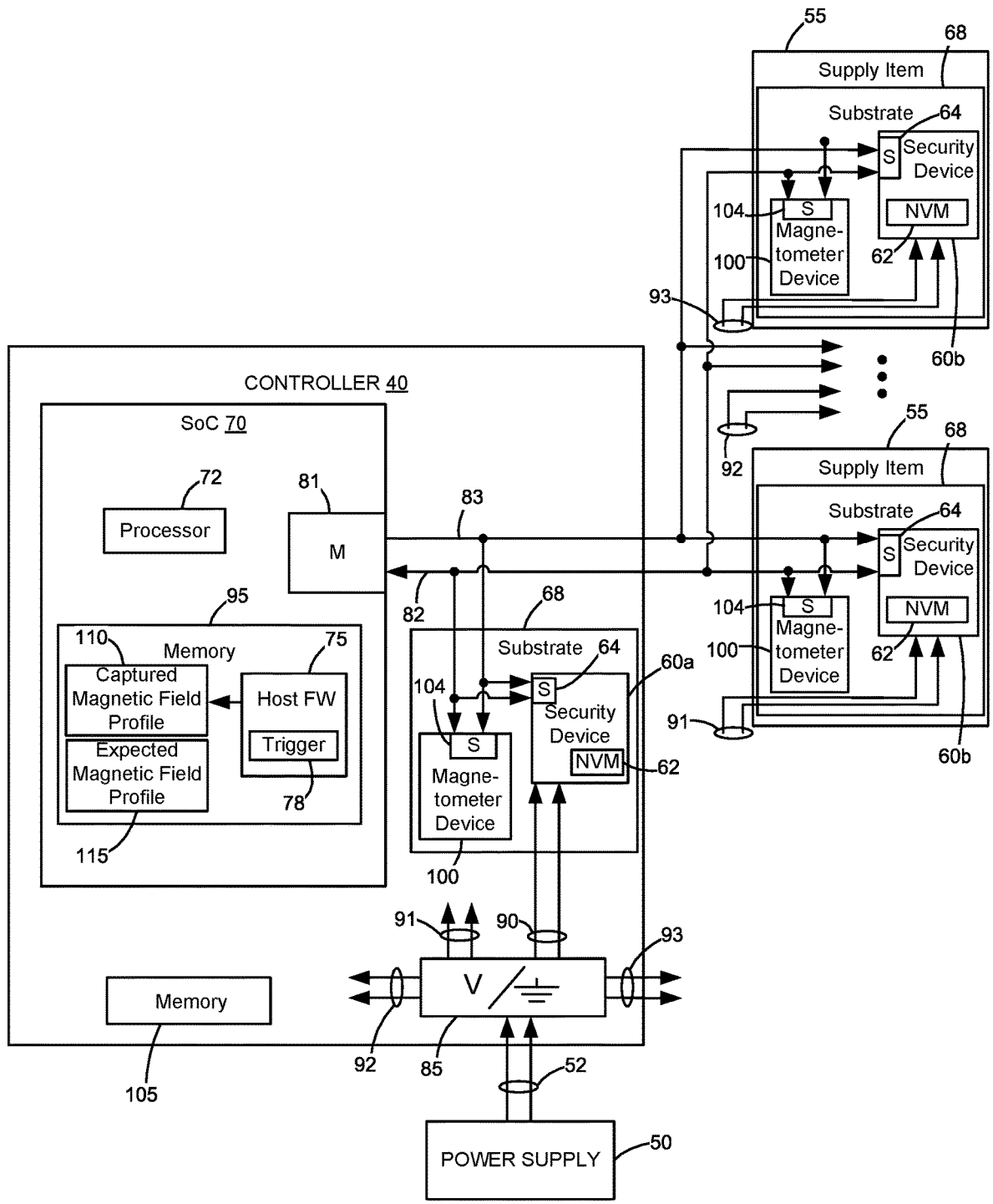
FIG. 12 is a block diagram of an example embodiment where a magnetometer device and a security device are assembled in a multi-chip module (MCM) package, wherein the magnetometer device and the security device are placed horizontally side by side (2D package) on a substrate.

In the embodiment shown in FIG. 12, the magnetometer device 100 and the security device 60 may be assembled in a multi-chip module (MCM) package 68. For example, a magnetometer chip (for magnetometer device 100) and a security chip (for security device 60) may be placed horizontally side by side (2D package) on a substrate 68. In this arrangement, the magnetometer chip may be located near the conductor carrying current to the security chip and the combined device may be placed on supply item 55 and on controller 40 and connected as shown. In this embodiment, the slave serial interface 104 of the magnetometer chip and the slave serial interface 64 of the security chip may be connected to the master serial interface 81 of the SoC 70 as shown. Although not shown, other connection schemes are also possible in other embodiments. The authentication of security devices 60 using magnetic field profiles generated from the current drawn by a security device 60 when it executes an authentication challenge command and measured by a magnetometer device 100 may be carried out as previously described.

Figure 13:
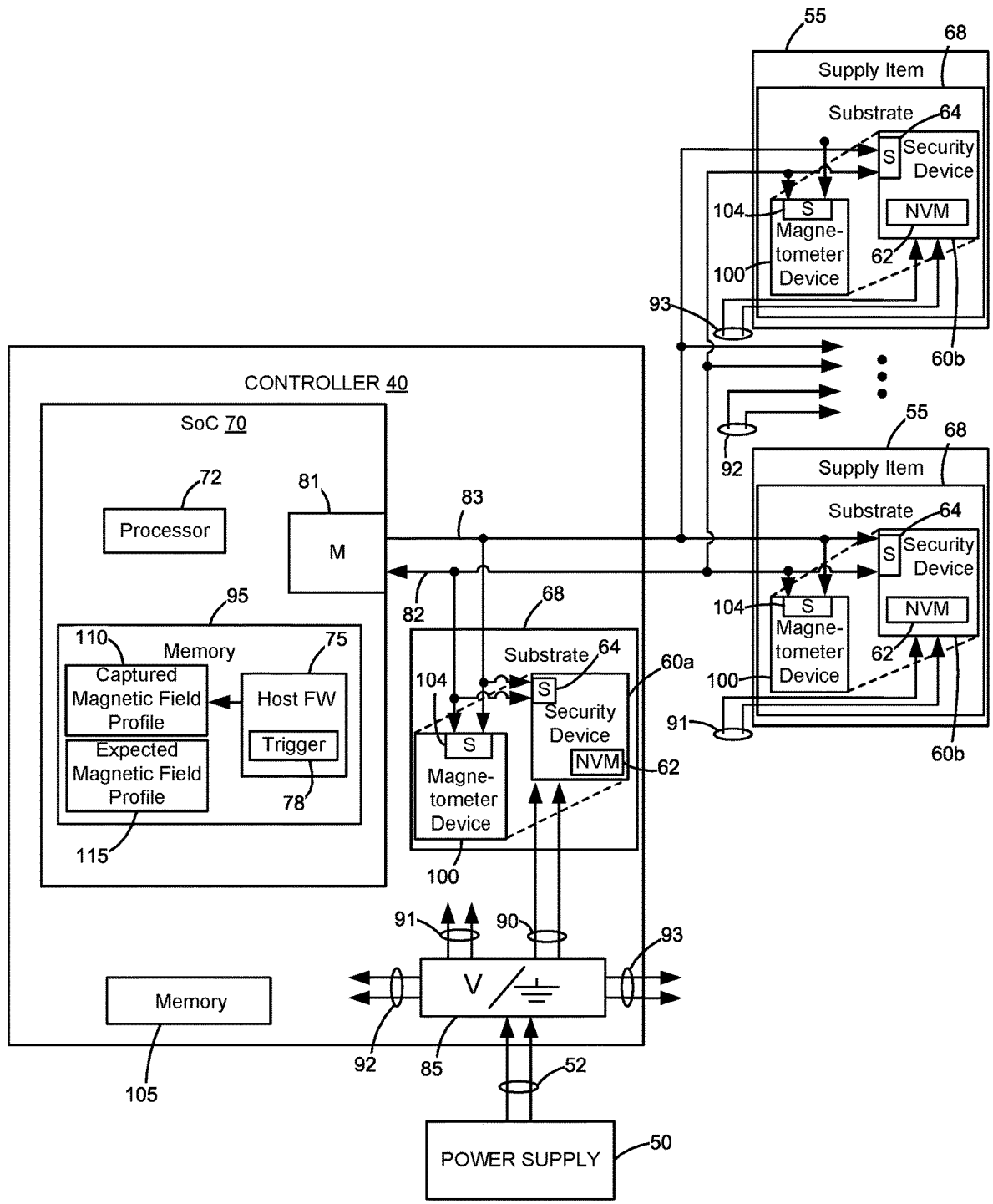
FIG. 13 is a block diagram of an example embodiment where a magnetometer device and a security device are assembled in a multi-chip module (MCM) package, wherein a magnetometer chip and a security chip are placed vertically in a chip-on-chip stack (3D package) on a substrate.

In the embodiment shown in FIG. 13, the magnetometer device 100 and the security device 60 may be assembled in a multi-chip module (MCM) package 68. For example, a magnetometer chip (for magnetometer device 100) and a security chip (for security device 60) may be placed vertically in a chip-on-chip stack (3D package) on a substrate 68. In this arrangement, the magnetometer chip (above or below the security chip) may be located near the conductor carrying current to the security chip and the combined device may be placed on supply item 55 and on controller 40 and connected as shown. In this embodiment, the slave serial interface 104 of the magnetometer chip and the slave serial interface 64 of the security chip may be connected to the master serial interface 81 of the SoC 70 as shown. As before, other connection schemes are possible in other embodiments. The authentication of security devices 60 using magnetic field profiles generated from the current drawn by a security device 60 when it executes an authentication challenge command and measured by a magnetometer device 100 may be carried out as previously described.

Figure 14:
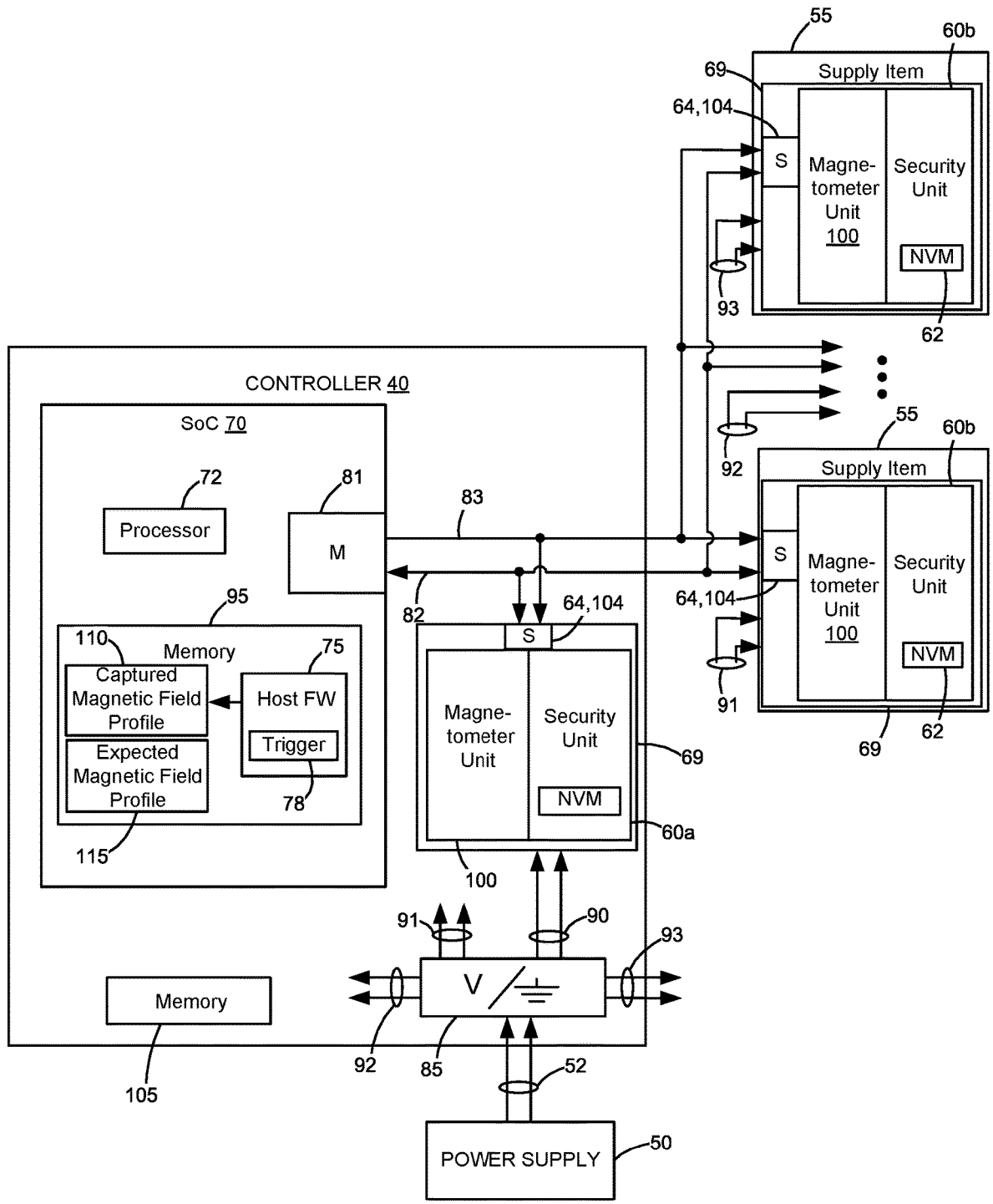
FIG. 14 is a block diagram of an example embodiment where a magnetometer device and a security device are integrated in a single chip, wherein the magnetometer device and the security device are fabricated on a same semiconductor substrate.

In the embodiment shown in FIG. 14, the magnetometer device 100 and the security device 60 may be integrated in a single chip, where at least one magnetometer unit (for magnetometer device 100), at least one security unit (for security device 60), at least one communication interface (S) 64, and at least one non-volatile memory (NVM) 62) are fabricated on the same semiconductor substrate 69. In this arrangement, the magnetometer unit 100 may be located near the conductor carrying current to the security unit and the integrated device may be placed on supply item 55 and on controller 40 and connected as shown. In this embodiment, the slave serial interface 104 of the magnetometer unit and the slave serial interface 64 of the security unit may be connected to the master serial interface 81 of the SoC 70 as shown. As before, other connection schemes are possible in other embodiments. The authentication of security devices 60 using magnetic field profiles generated from the current drawn by a security device 60 when it executes an authentication challenge command and measured by a magnetometer device 100 may be carried out as previously described.

In each of the embodiments, illustrated in FIGS. 10-14, and previously described, at least one security device 60 and at least one magnetometer device 100 and at least one communication interface 64, 104, and at least one non-volatile memory (NVM) 62 have been combined in multiple discrete 63, 68 and integrated forms 69 to form a device for authenticating supply items 55 in an imaging device 15 using magnetic field profiles generated from current drawn by the security device 60 when executing an authentication challenge. Finally, these devices may be authenticated substantially concurrently using one-way authentication, mutual authentication, or self-authentication.

The description of the details of the above example embodiments have been described in the context of using wired communication. In a further embodiment, security devices 60 may be connected by wireless technology to transmit and receive challenge and response signals by antenna to implement the authentication methods disclosed herein. In this embodiment, a security device 60 on controller 40 and a security device 60 on a supply item 55 may communicate with each other wirelessly. A security device 60 on a supply item 55 and another security device 60 on another supply item 55 may also communicate with each other wirelessly. Other embodiments are also possible including placing individual voltage regulators on each supply item 55 and connecting the voltage regulators to the power supply unit 50 and to the security device on the supply item.

With the above example embodiments, magnetic field-based methods of authenticating security devices have been disclosed that use one or more commands, a trigger condition, a measurement interval, a captured magnetic field profile, an expected magnetic field profile, an authentication algorithm, and a predetermined threshold to perform one-way, mutual, or self-authentication of security devices on a controller or on a supply item. It should be understood that many different combinations of these commands, parameters, challenges, responses, algorithms, thresholds, protocols, devices, locations, and connections, each with unique characteristics, may be used to implement the magnetic field-based authentication concepts disclosed herein and all combinations of these component parts are considered embodiments of this invention.

The foregoing illustrates various aspects of the invention. It is not intended to be exhaustive. Rather, it is chosen to provide the best mode of the principles of operation and practical application known to the inventors so one skilled in the art can practice it without undue experimentation. All modifications and variations are contemplated within the scope of the invention as determined by the appended claims. Relatively apparent modifications include combining one or more features of one embodiment with those of another embodiment.

The invention claimed is:

1. A supply item for installation in an imaging device, comprising:
   a housing; and
   a security chip connected to the housing, the security chip for receiving an authentication challenge including one or more commands when the supply item is installed in the imaging device, wherein when the security chip receives the authentication challenge the security chip is operative to execute the one or more commands while drawing current from a power source of the imaging device to generate a magnetic field around a conductor carrying the current drawn by the security chip while executing the one or more commands, the generated magnetic field indicating an authentication response of the security chip to the authentication challenge.

2. The supply item of claim 1, wherein the security chip determines authenticity of the supply item by comparing the generated magnetic field with an expected magnetic field profile.

3. The supply item of claim 2, wherein the expected magnetic field profile is predetermined.

4. The supply item of claim 2, wherein the expected magnetic field profile corresponds to a second authentication response to the authentication challenge of a second security chip.

5. The supply item of claim 1, wherein the security chip is operative to receive an authentication command to generate a second authentication challenge for sending to a second security chip.

6. The supply item of claim 1, wherein the security chip is operative to transmit a profile of the generated magnetic field as a magnetic field profile response to a master when connected thereto for use by the master in determining authenticity of the supply item.

7. The supply item of claim 1, wherein the security chip is operative to transmit a profile of the generated magnetic field as an expected magnetic field profile response for a second security chip.

8. The supply item of claim 1, further comprising a magnetometer for measuring the magnetic field.

9. The supply item of claim 8, wherein the security chip and the magnetometer are integrated into a single unit.

10. The supply item of claim 1, wherein the supply item is a toner cartridge.

11. A supply item for installation in an imaging device, comprising:
    a housing; and
    a security chip connected to the housing, the security chip for receiving an authentication challenge including one or more commands when the supply item is installed in the imaging device, wherein when the security chip receives the authentication challenge the security chip is operative to execute the one or more commands while drawing current from a power source of the imaging device, and generate a magnetic field profile based on a magnetic field that is generated around a conductor carrying the current drawn by the security chip while executing the one or more commands, the generated magnetic field profile indicating an authentication response of the security chip to the authentication challenge.

12. The supply item of claim 11, further comprising a magnetometer for measuring the magnetic field.

13. The supply item of claim 12, wherein the magnetometer and the security chip are assembled in a multi-chip module package where the magnetometer and the security chip are placed horizontally side by side on a substrate.

14. The supply item of claim 12, wherein the magnetometer and the security chip are assembled in a multi-chip module package where the magnetometer and the security chip are placed vertically in a chip-on-chip stack on a substrate.

15. The supply item of claim 12, wherein the magnetometer and the security chip are integrated in a single chip where the magnetometer and the security chip are fabricated on the same semiconductor substrate.

16. The supply item of claim 11, wherein the security chip determines authenticity of the supply item by comparing the generated magnetic field profile with an expected magnetic field profile.

17. A supply item for installation in an imaging device having a master controller, comprising:
    a housing; and
    a chip connected to the housing, the chip for receiving an authentication challenge including one or more commands when the supply item is installed in the imaging device, wherein when the chip receives the authentication challenge the chip is operative to execute the one or more commands while drawing current from a power source of the imaging device, measure a magnetic field generated around a conductor carrying the current drawn by the chip while executing the one or more commands, and send the measured magnetic field to the master controller, the measured magnetic field indicating an authentication response of the chip to the authentication challenge.

18. The supply item of claim 17, wherein the chip includes a security chip for receiving the authentication challenge and executing the one or more commands, and a magnetometer chip for measuring the magnetic field.

19. The supply item of claim 17, wherein the chip sends the measured magnetic field to the master controller as an expected magnetic field profile response for a second chip for use by the master controller in determining authenticity of the second chip.

20. The supply item of claim 1, wherein the chip is operative to receive an authentication command to generate a second authentication challenge for sending to a second chip.

* * * * *